June 23, 1970   B. J. NIGRELLI ET AL   3,516,219
MACHINE FOR FOLDING AND SEALING CARTONS
Filed March 17, 1967   20 Sheets-Sheet 1
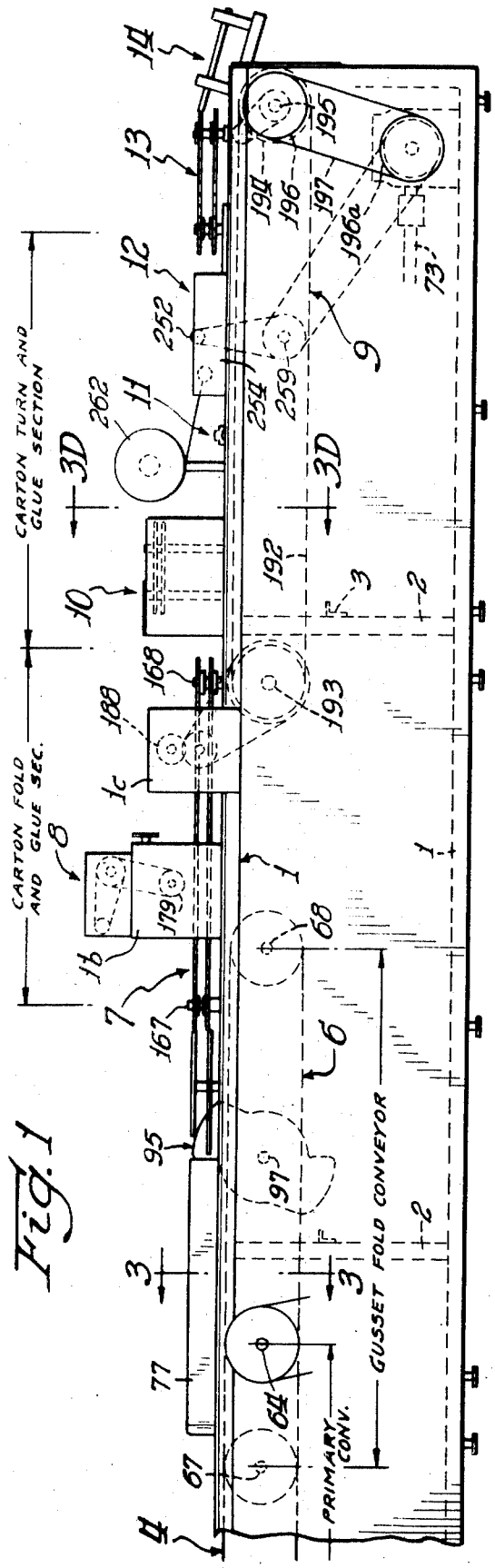
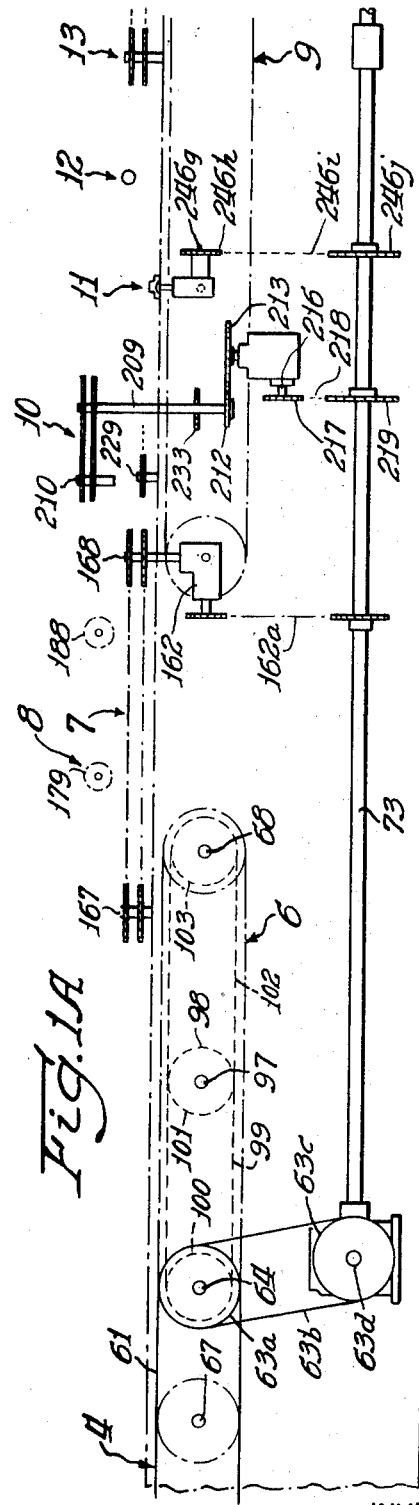
INVENTORS
BIAGIO J. NIGRELLI
WENDELL E. STANDLEY
RICHARD B. WITTMANN
BY Higgs, Carpenter & Lind
ATTORNEYS

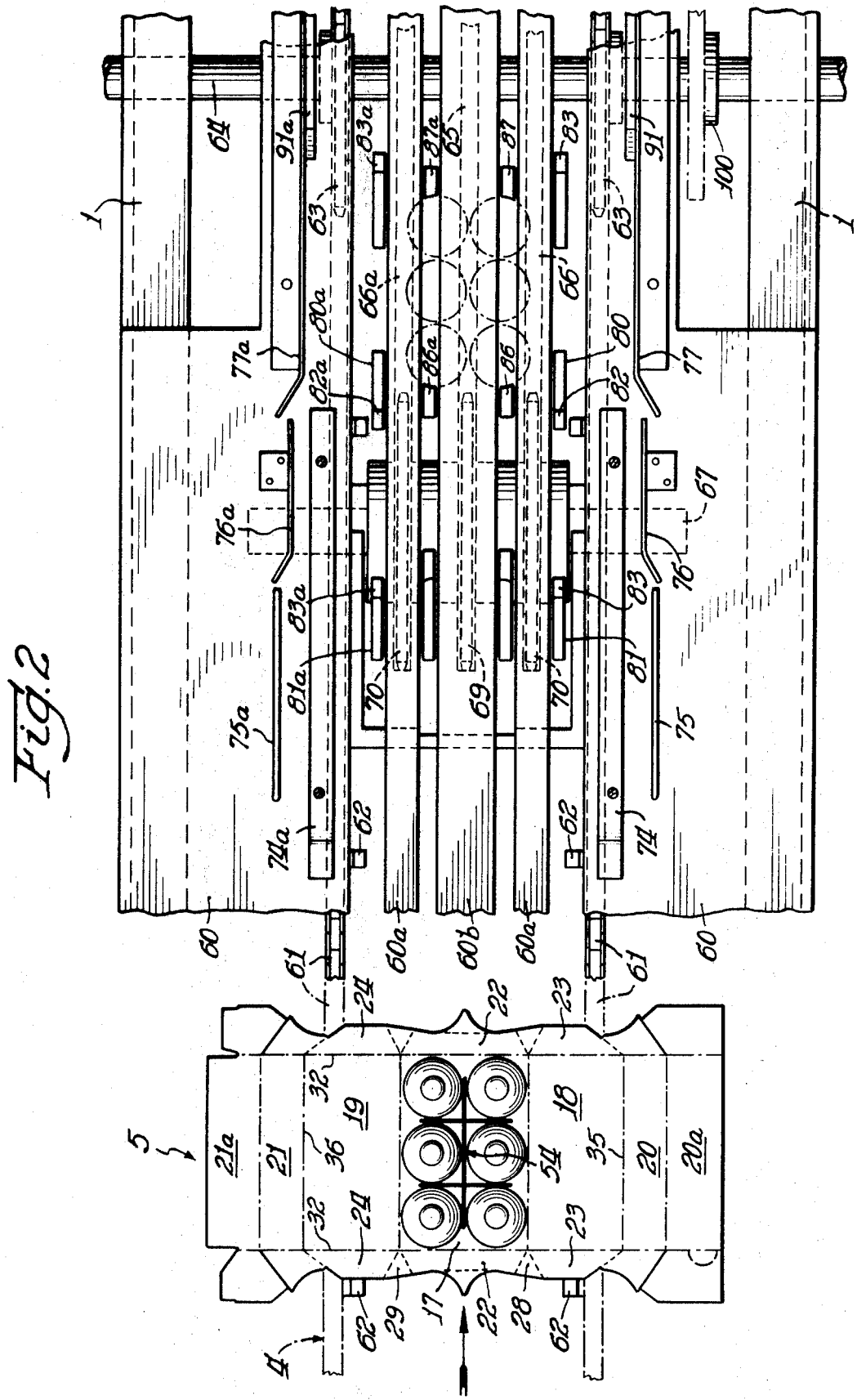

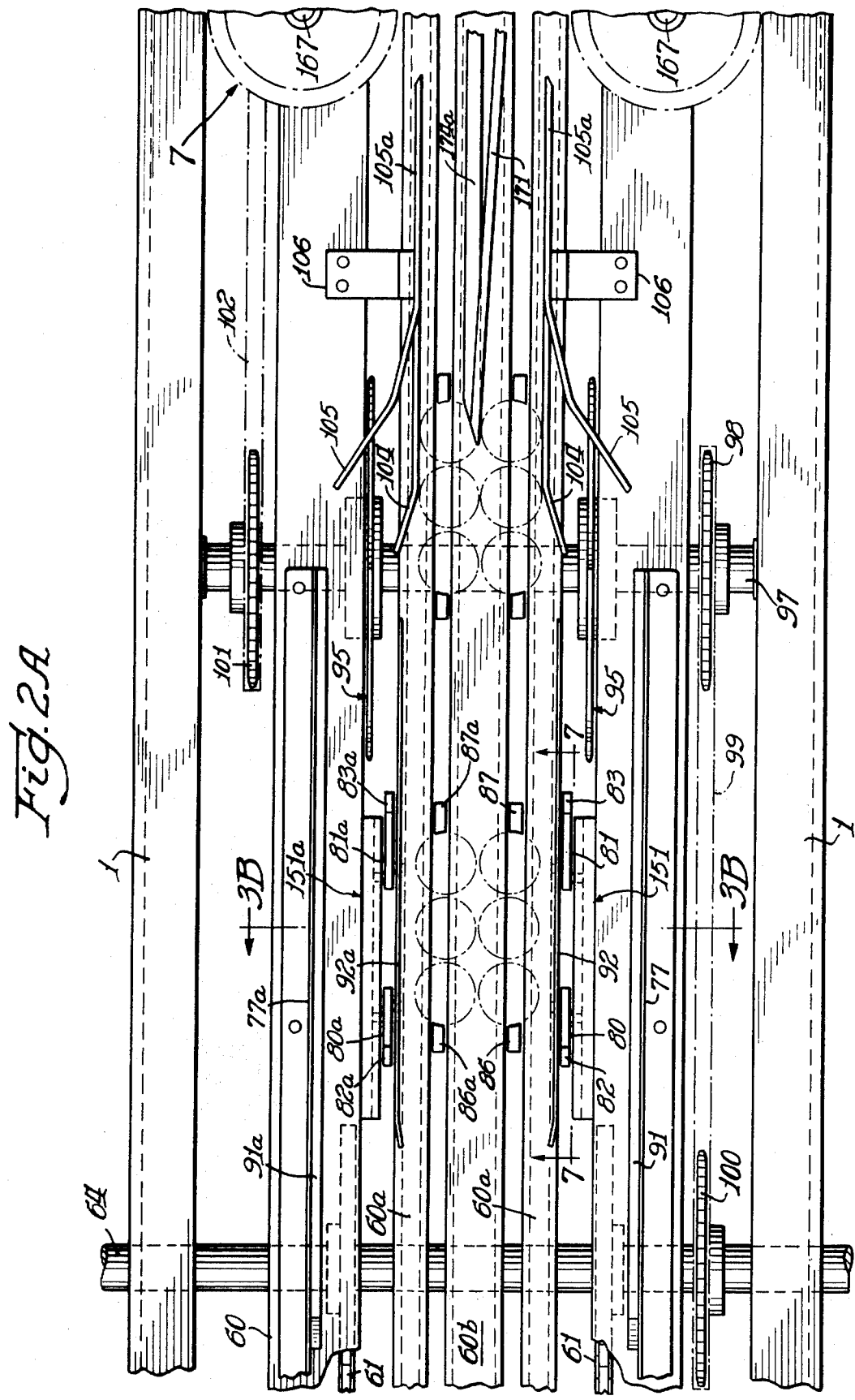

Fig. 2B

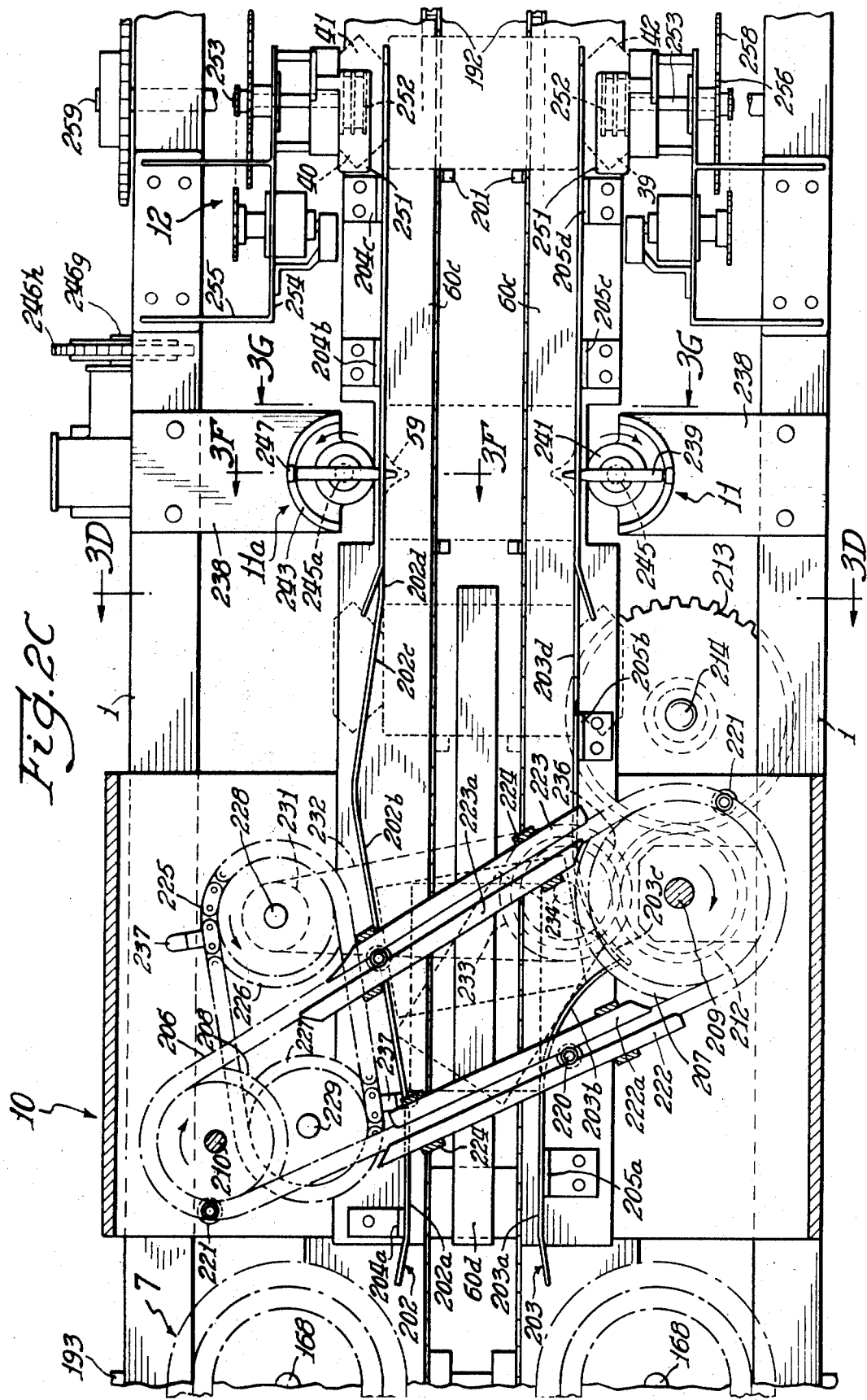

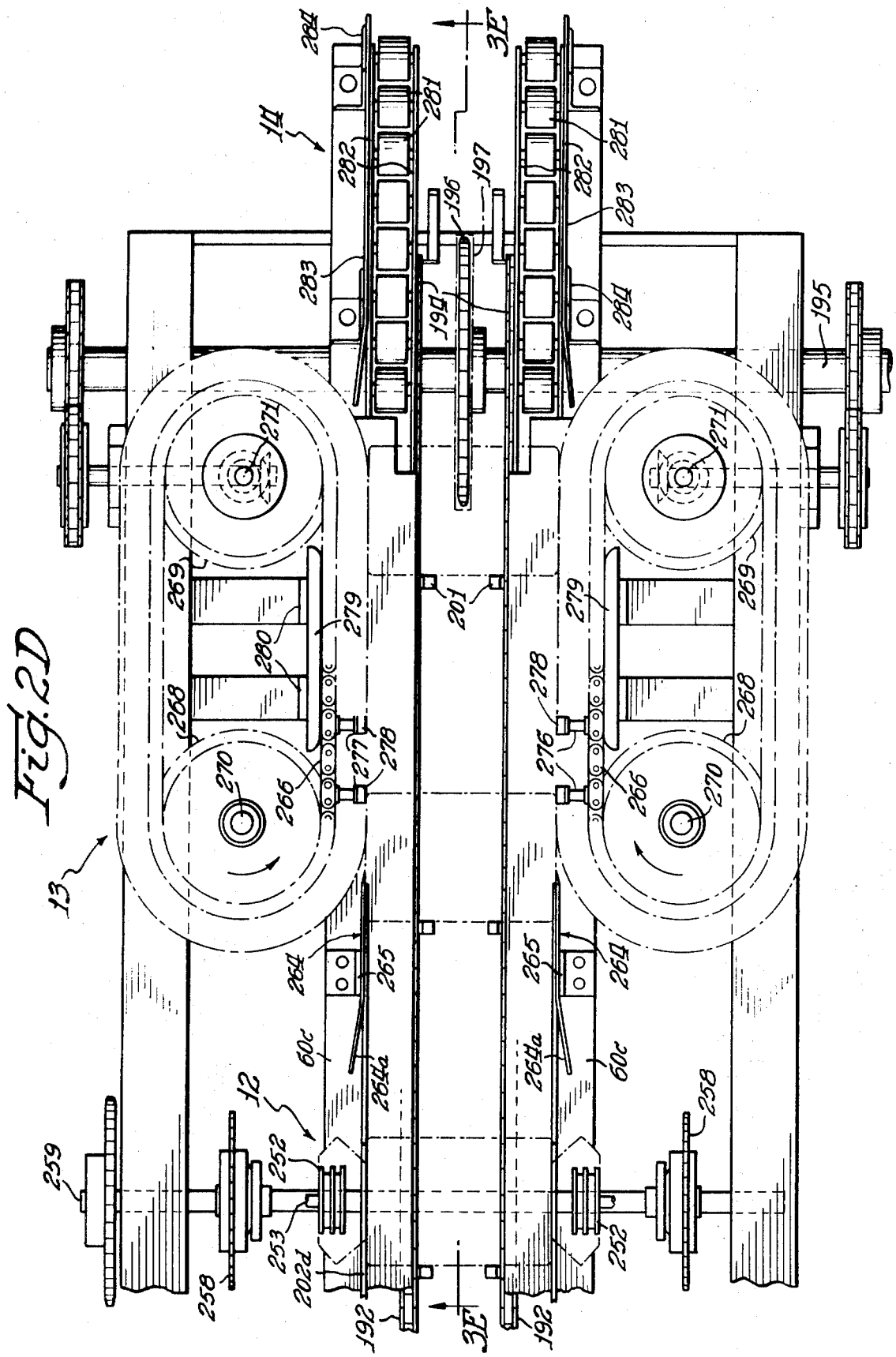

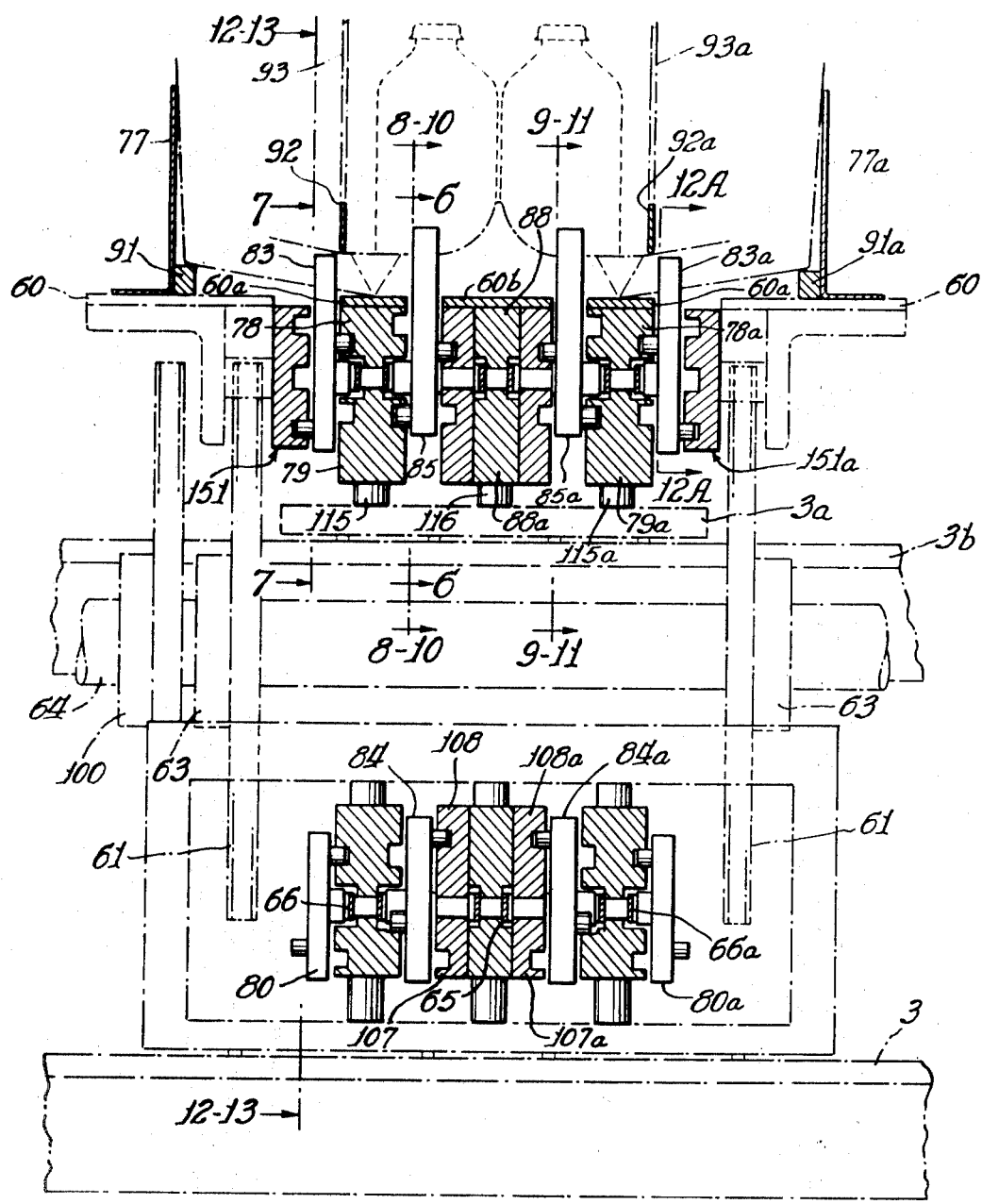

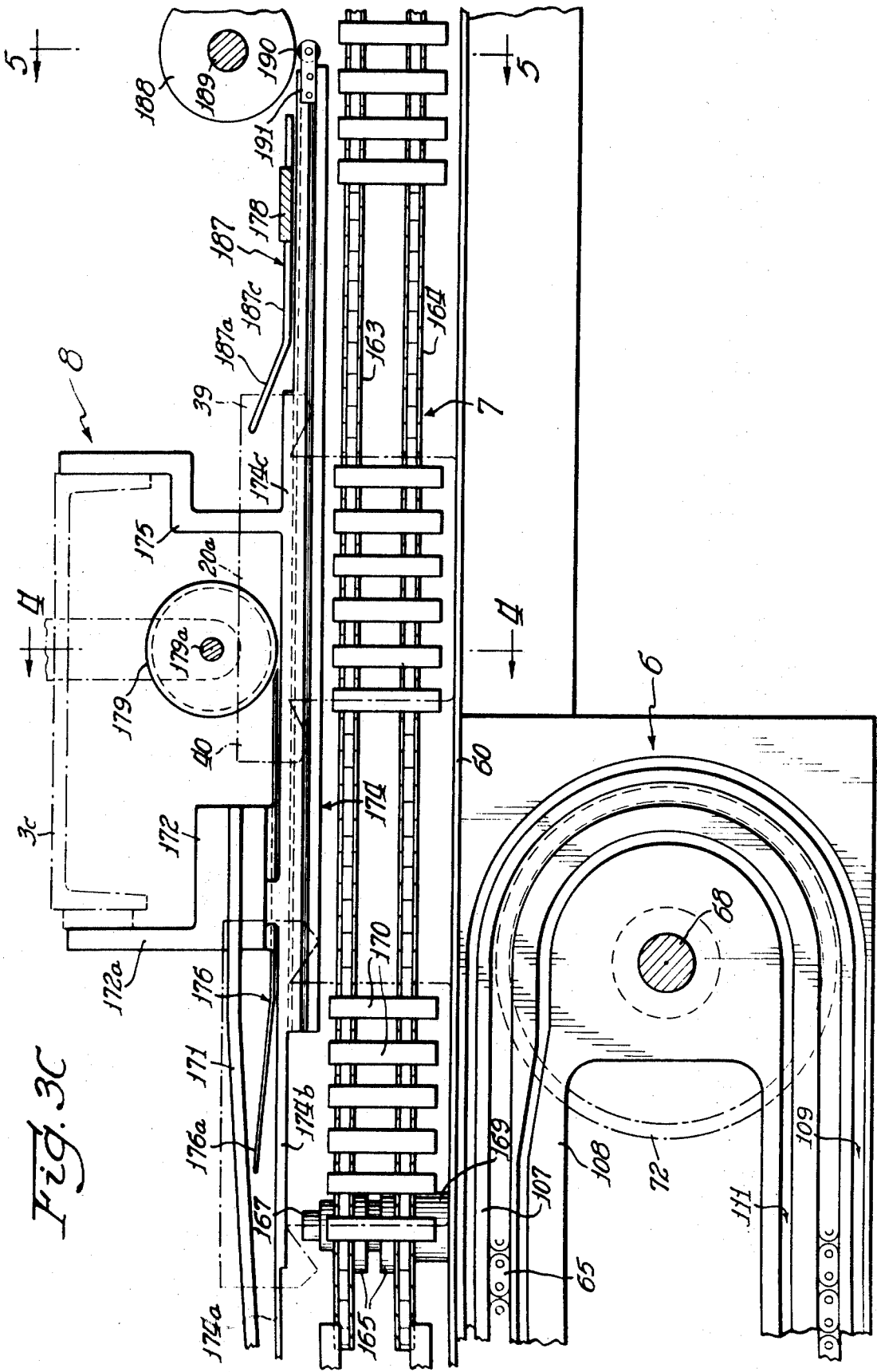

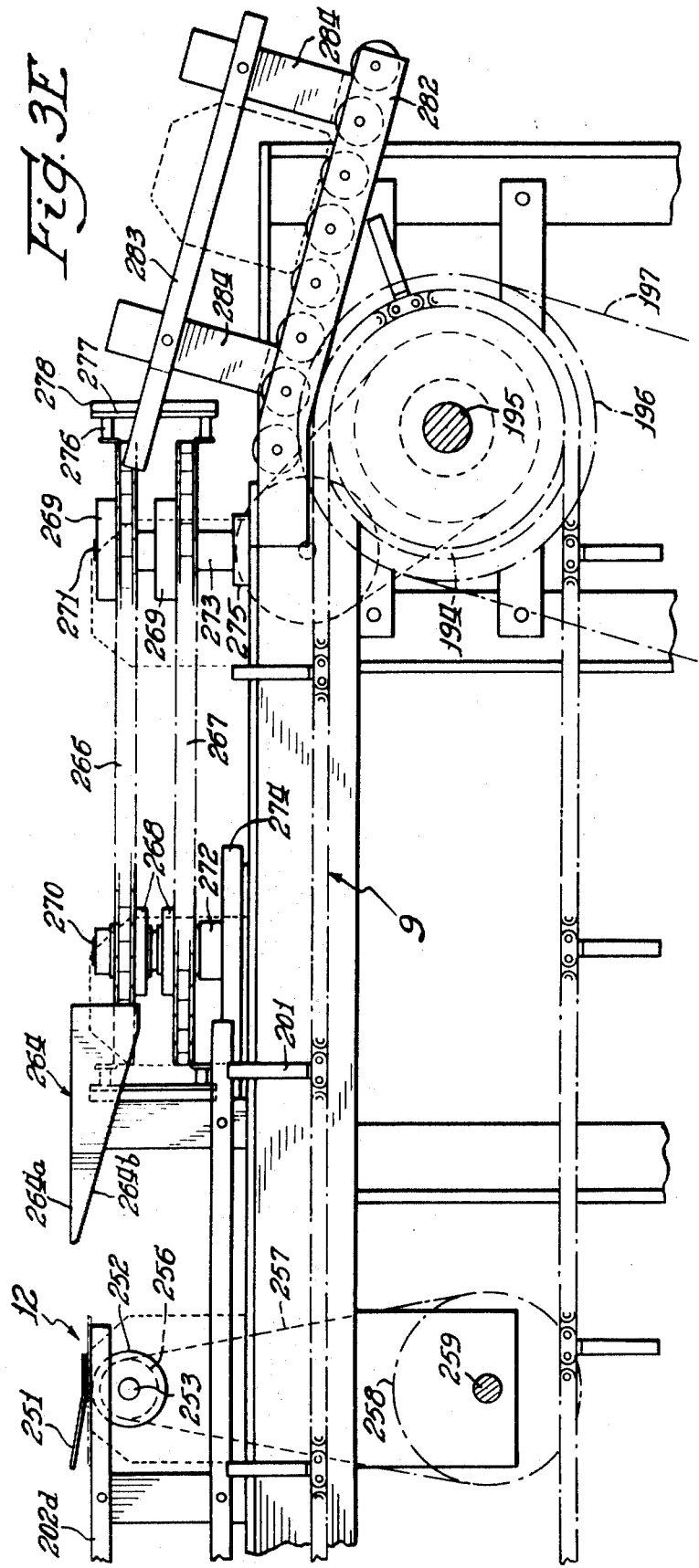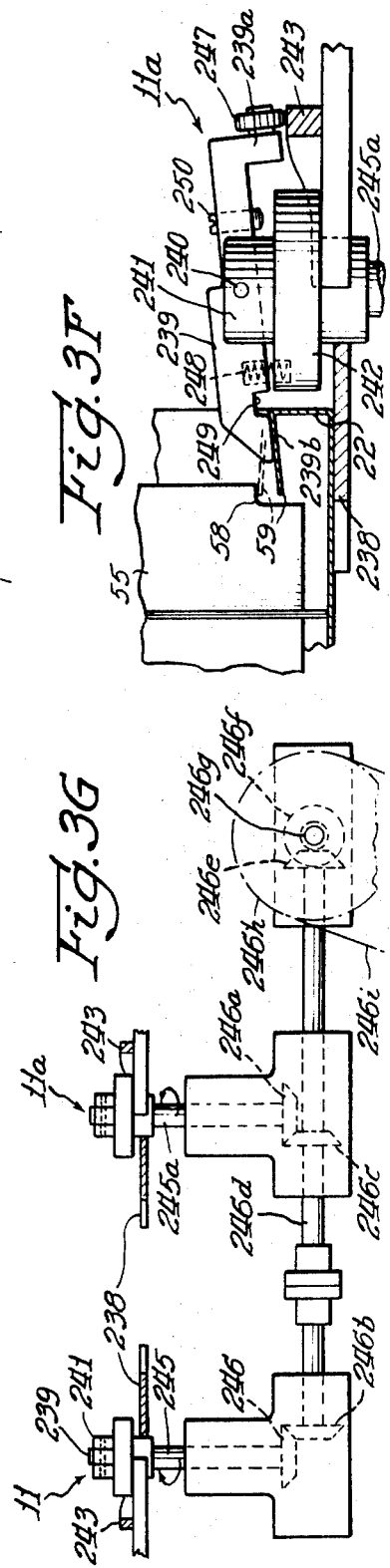

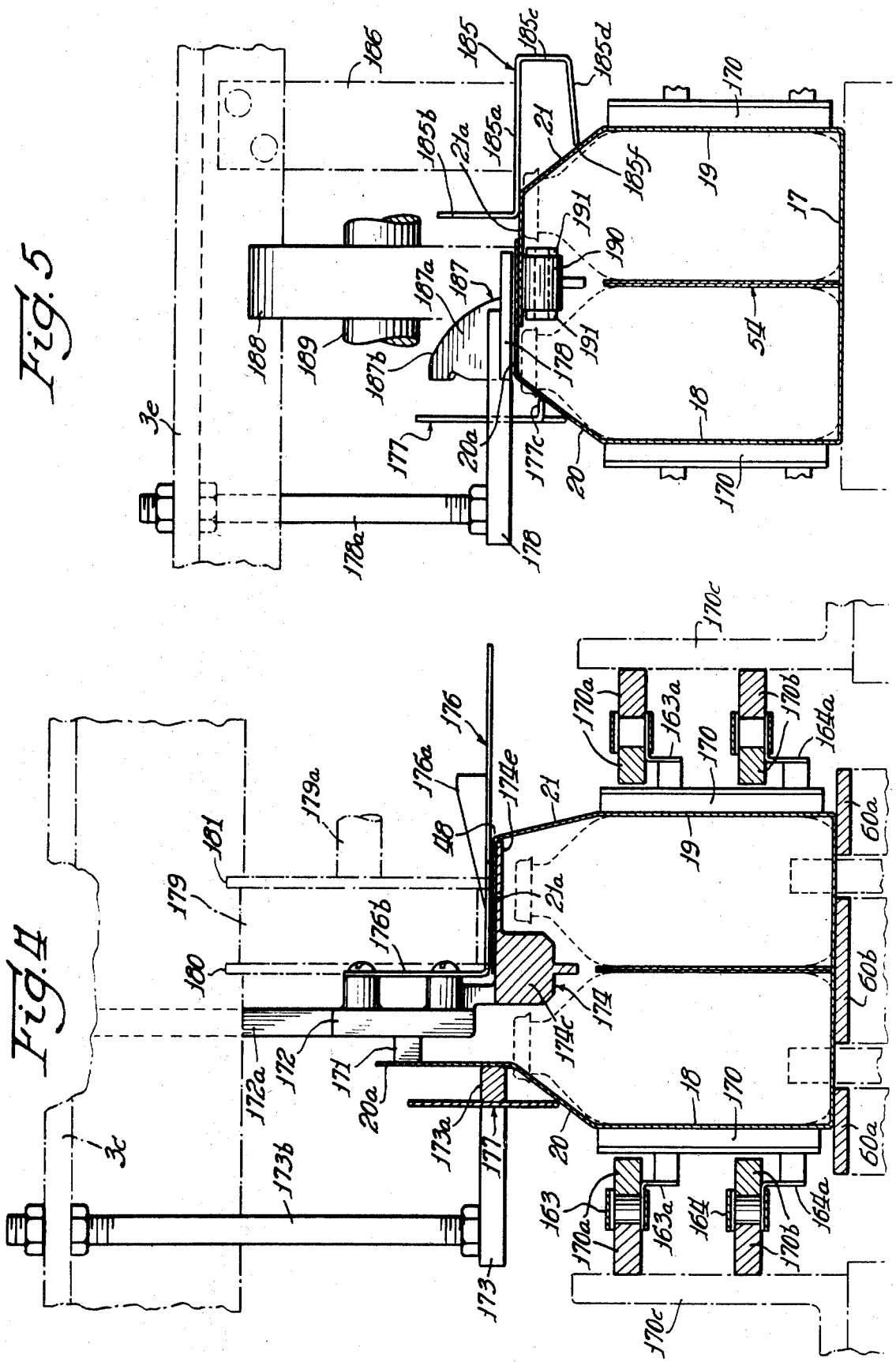

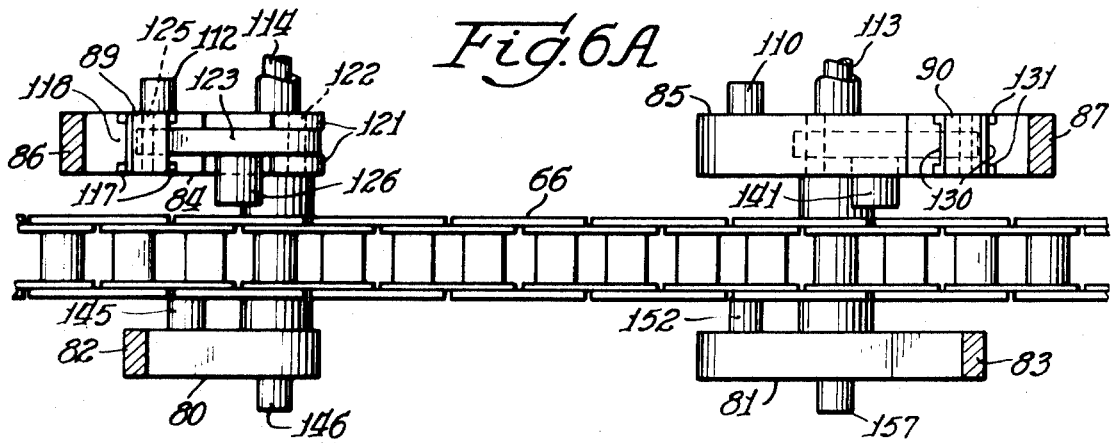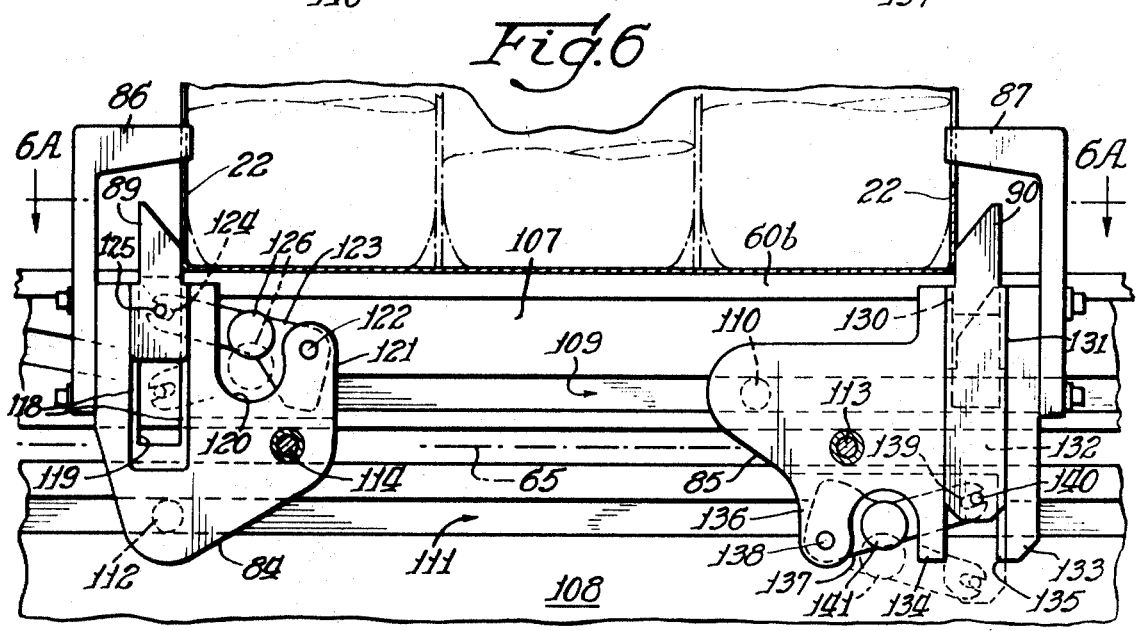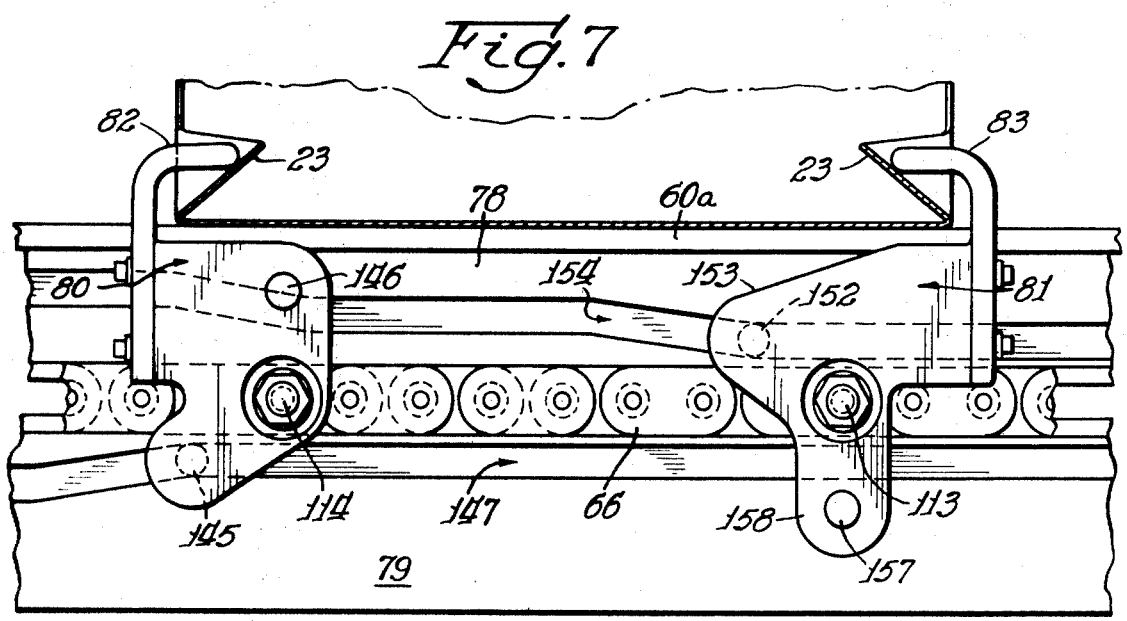

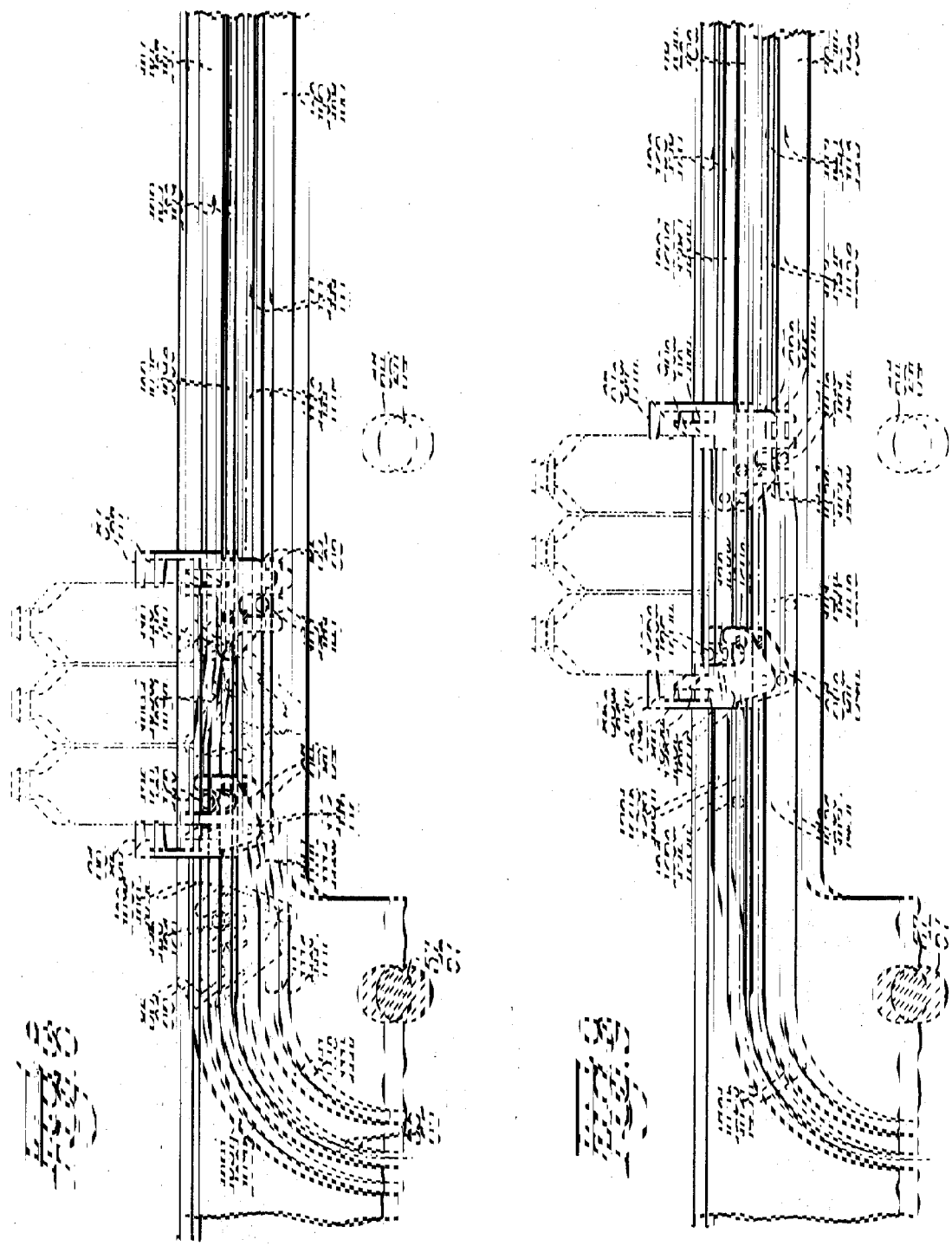

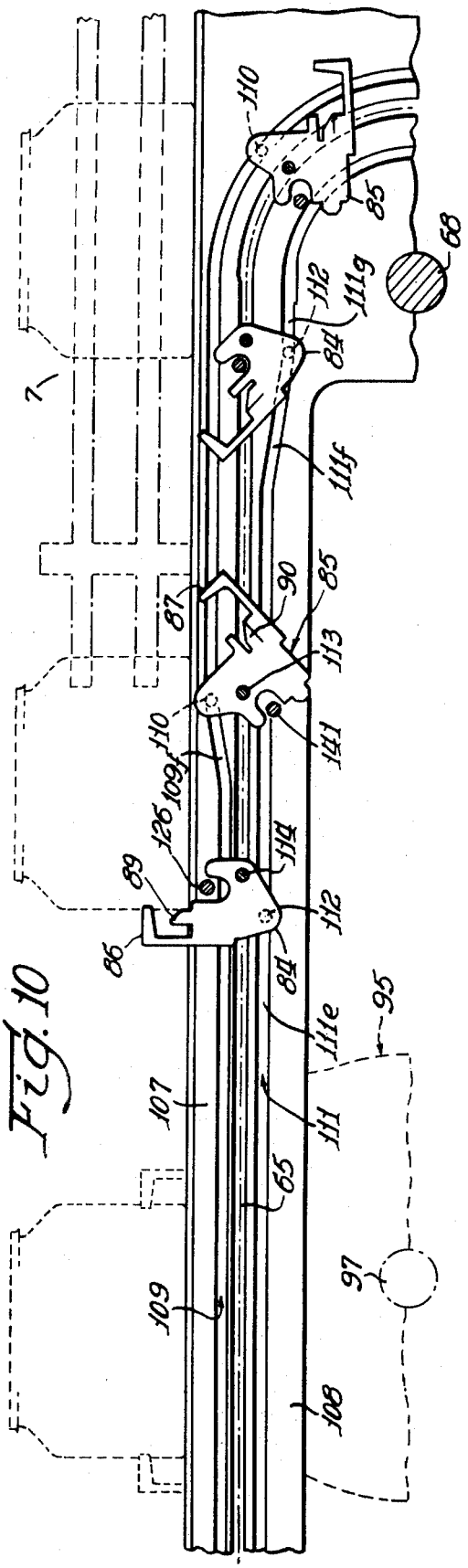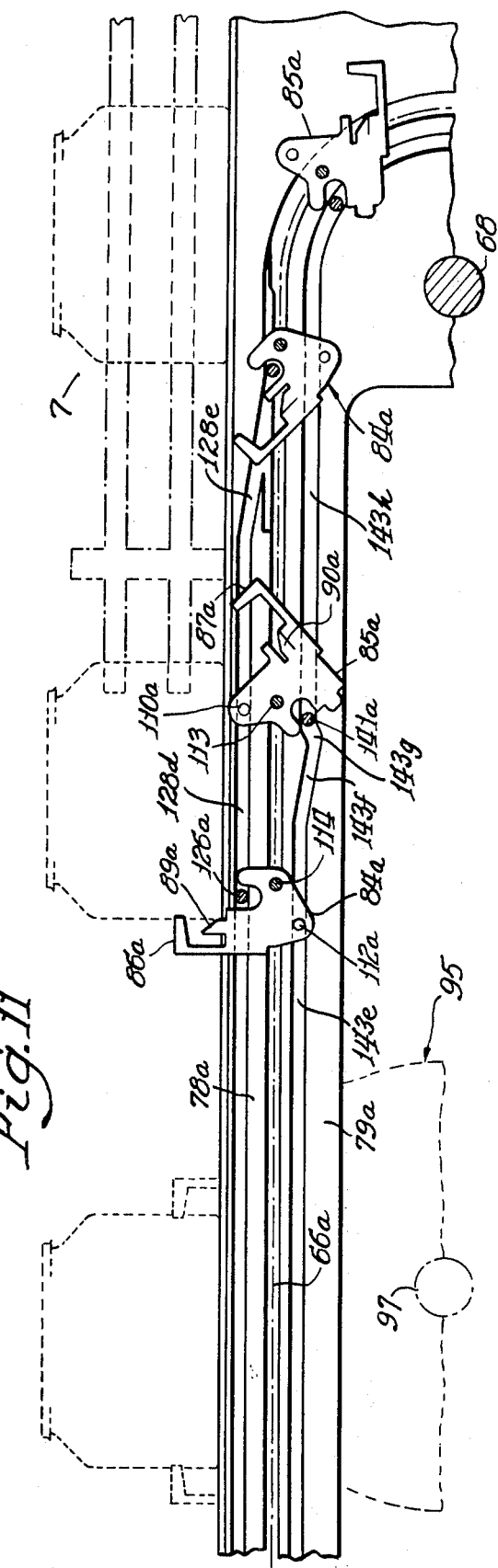

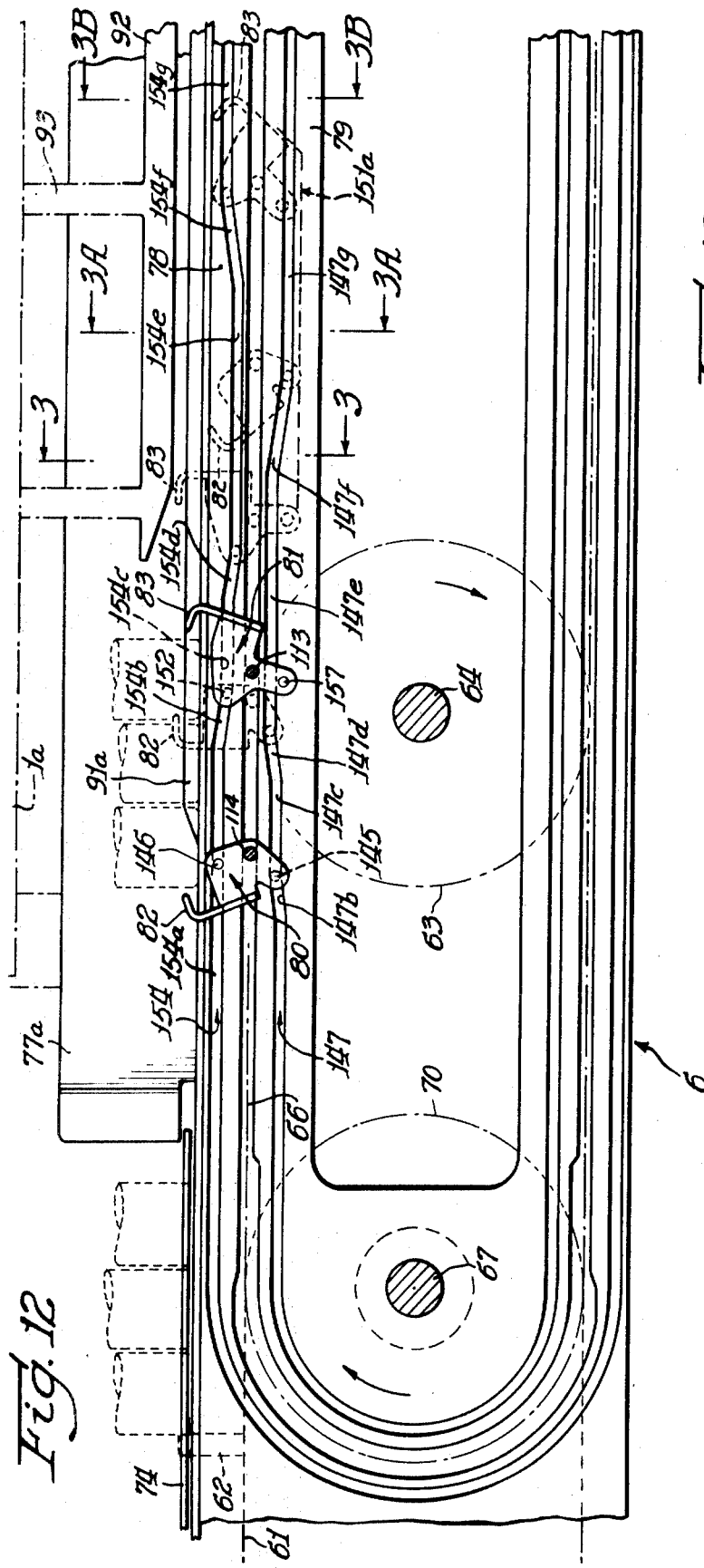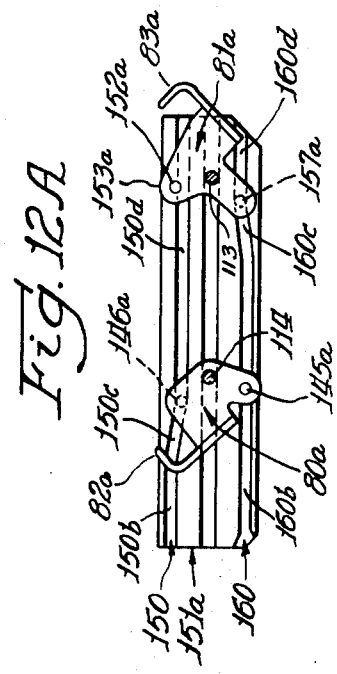

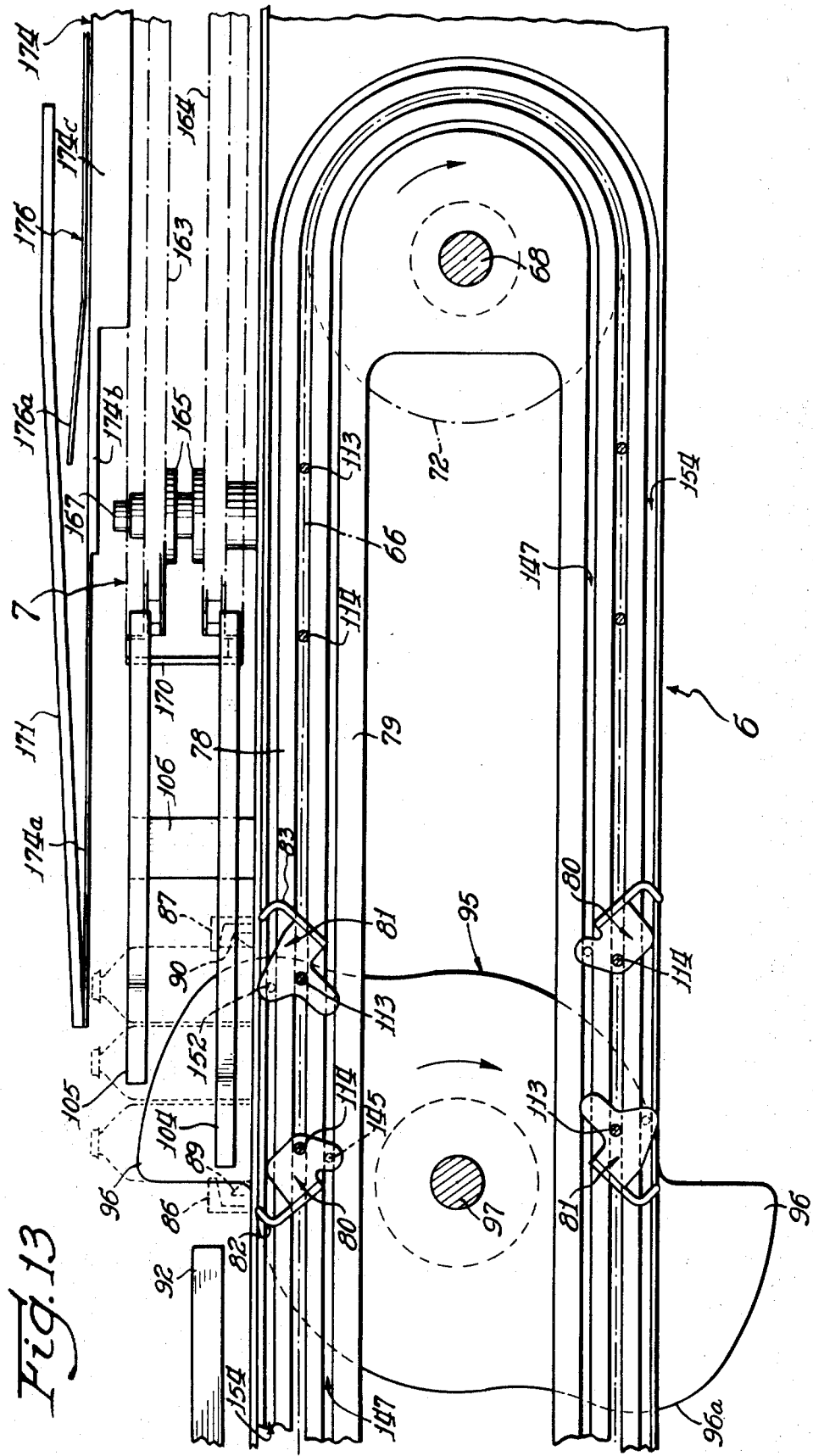

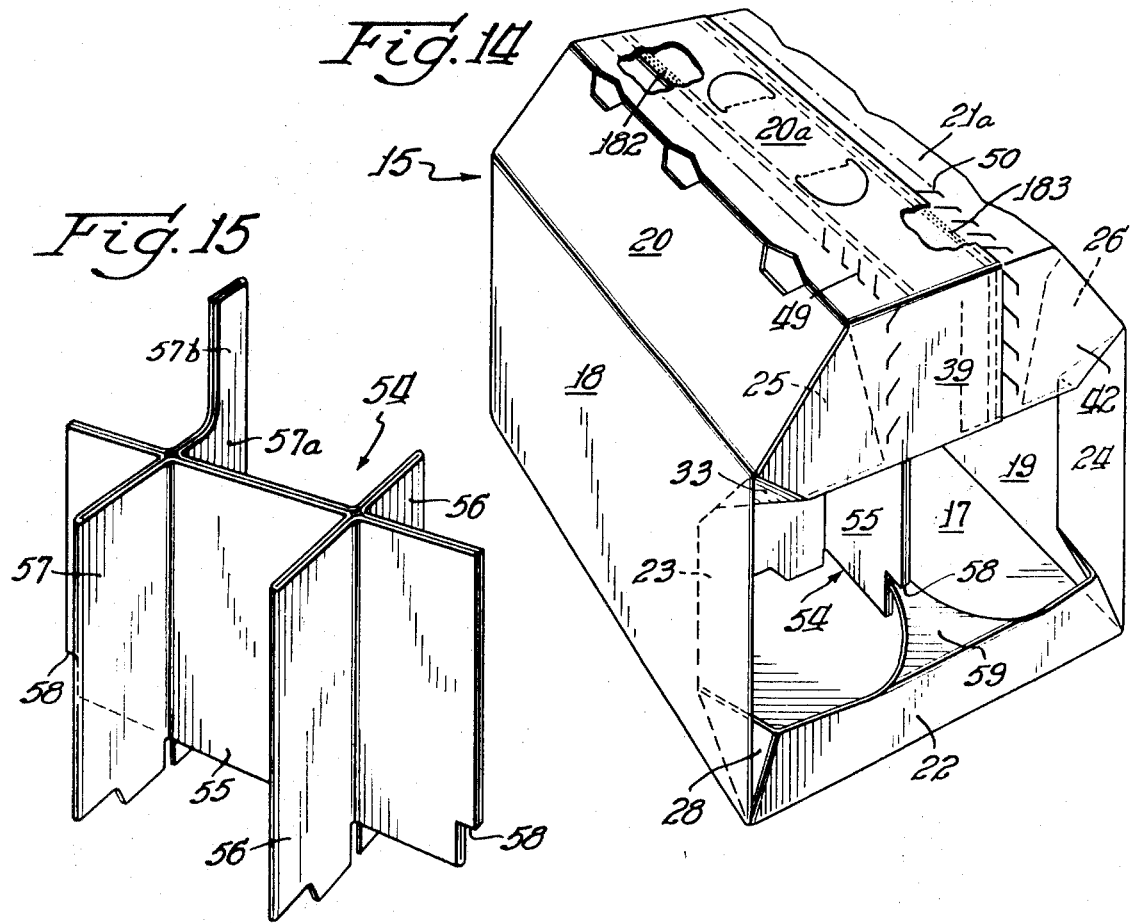
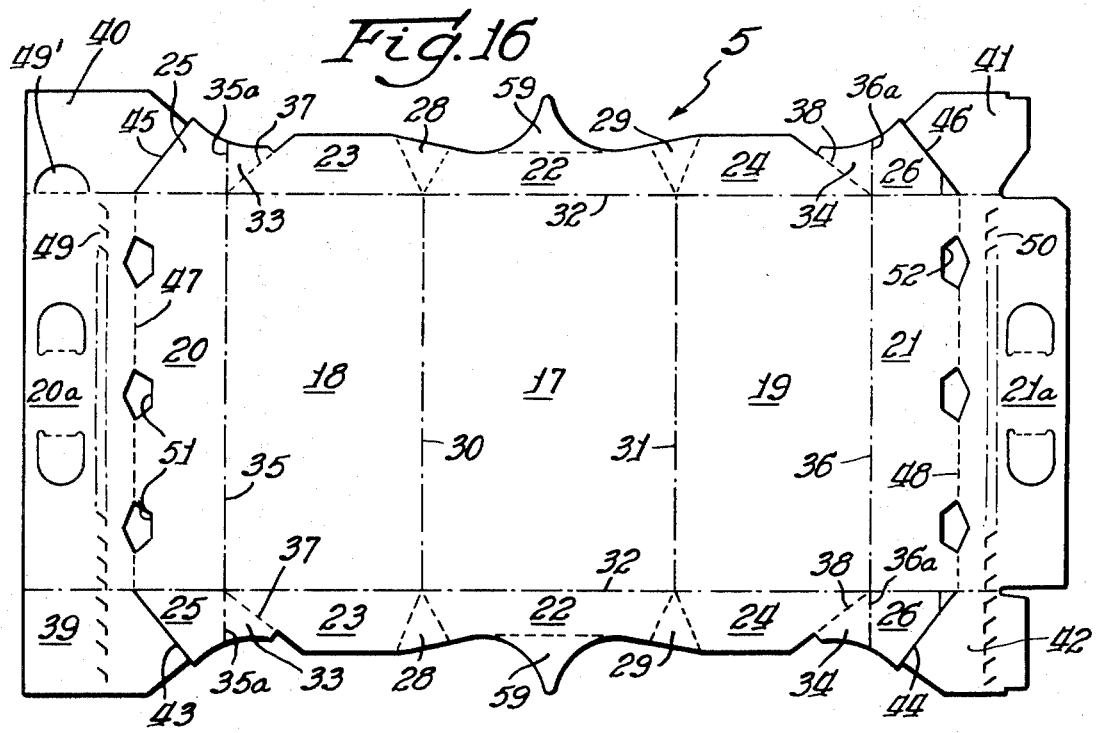

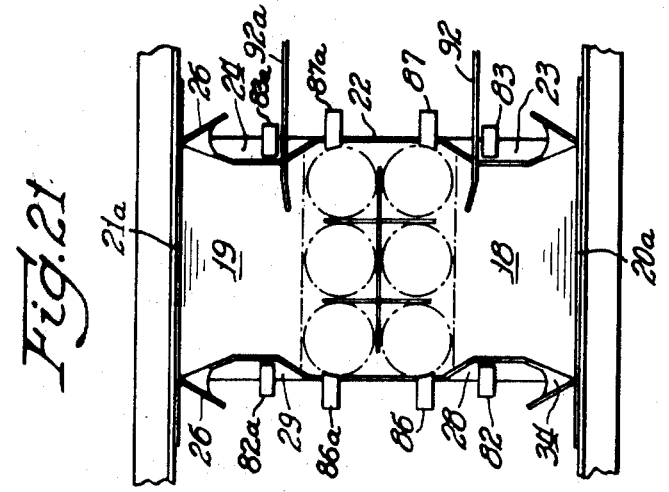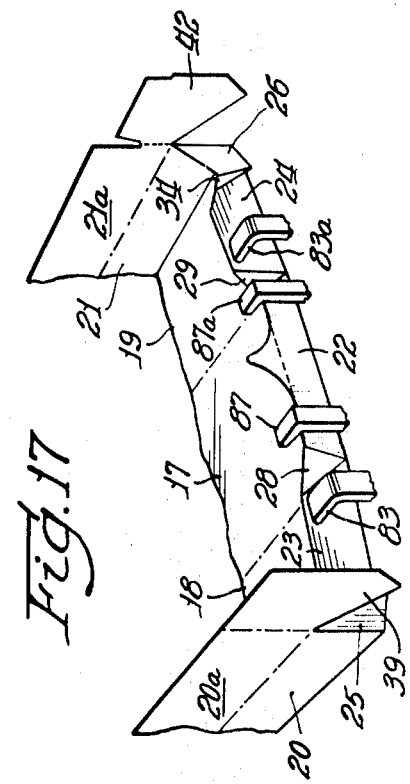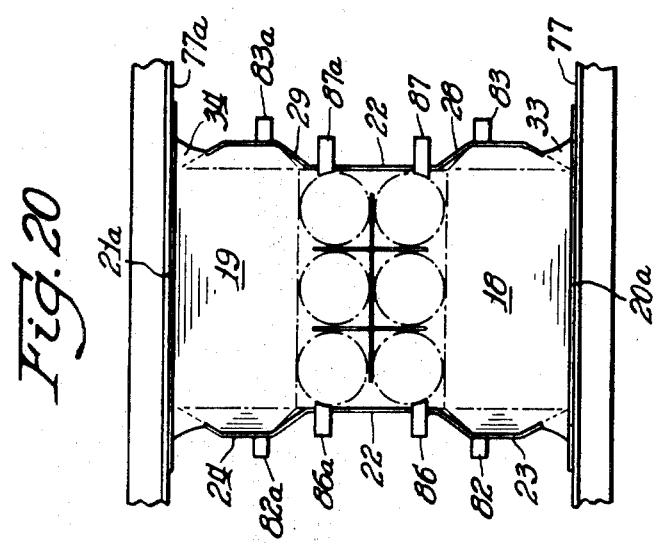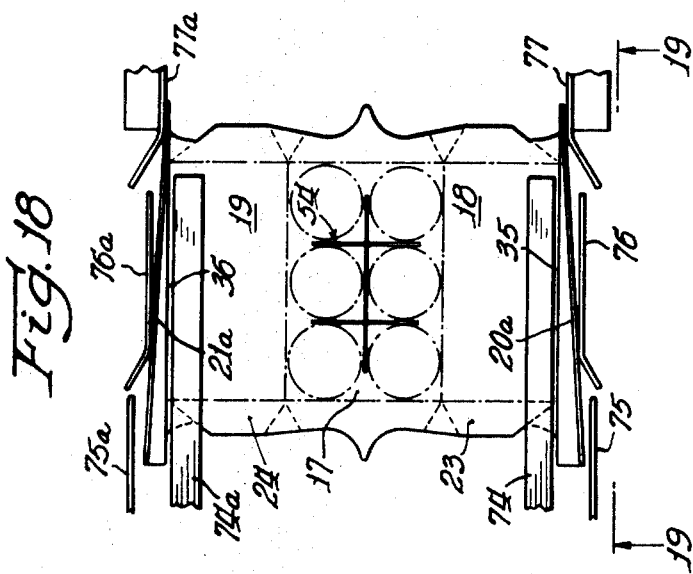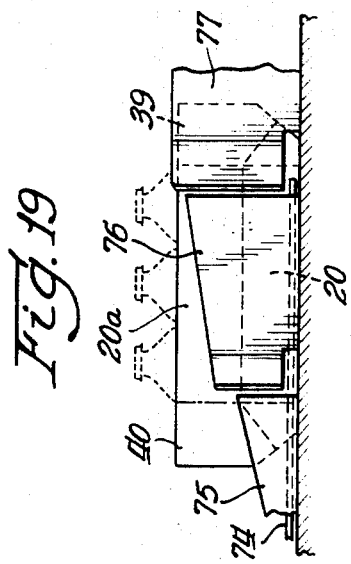

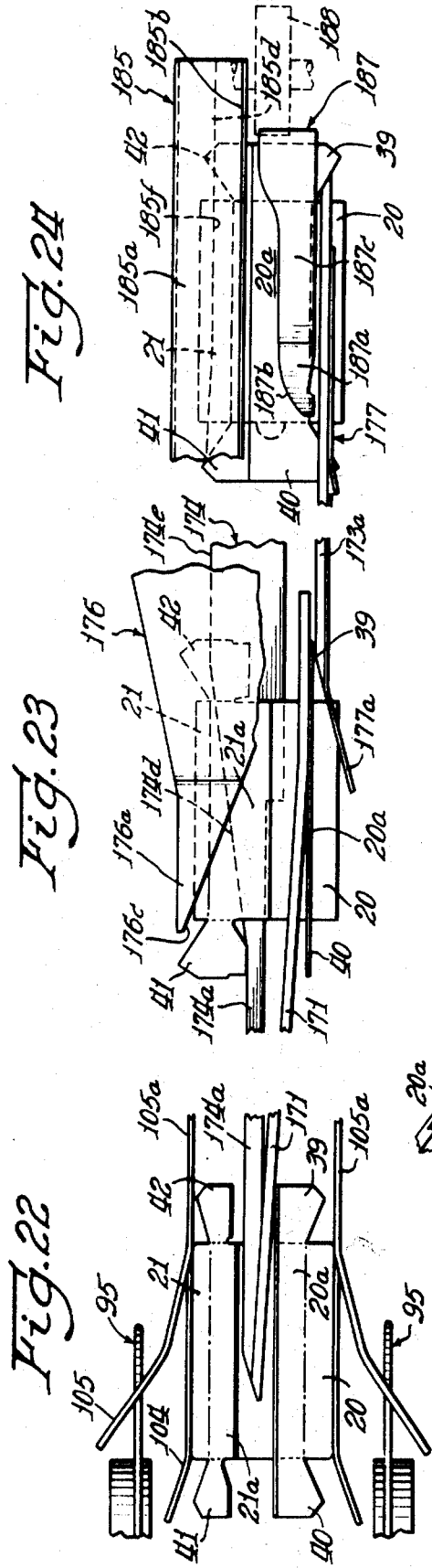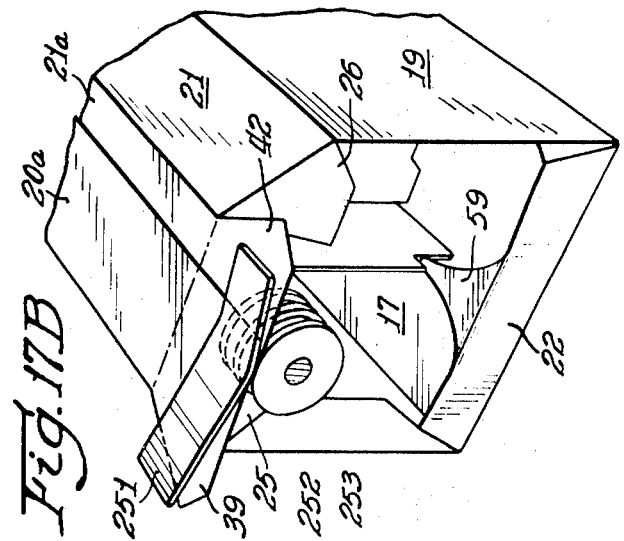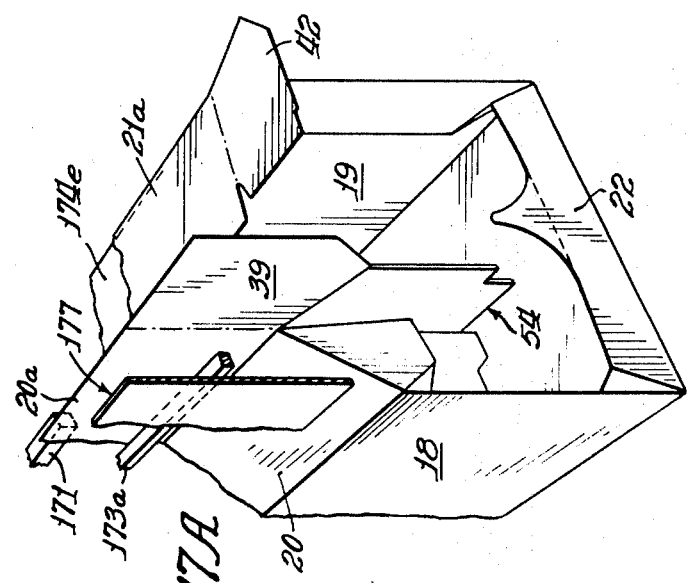

United States Patent Office 3,516,219
Patented June 23, 1970

3,516,219
MACHINE FOR FOLDING AND SEALING CARTONS
Biagio J. Nigrelli, Northbrook, Wendell E. Standley, Lake Forest, and Richard B. Whittmann, Chicago, Ill., assignors to Container Corporation of America, Chicago, Ill., a corporation of Delaware
Filed Mar. 17, 1967, Ser. No. 623,963
Int. Cl. B65b *11/12, 21/24*
U.S. Cl. 53—48                    10 Claims

ABSTRACT OF THE DISCLOSURE

A machine for folding a carrier, formed from a pre-scored blank of foldable paperboard, about a group of two rows of containers, such as bottles, the machine including a conveyor for advancing the blank, together with bottles positioned thereon, through the machine. The blank has flanges on the ends of the panels representing bottom and side walls of the carrier. The machine has means for folding these flanges upwardly and means for swinging the side wall panels upward. Additional means are provided for holding the side wall panels in upraised position and for confining each of the side wall panel flanges between the side wall panels and the respective adjacent end bottles of the rows of bottles positioned on the blank.

---

This is a companion application to application, Ser. No. 624,002, filed Mar. 17, 1967, for Orienting and Loading Machine. The present invention pertains to carton folding and sealing mechanism and particularly relates to mechanism for folding and sealing cartons such as disclosed in the patents to J. V. Mahon, No. 3,167,214, for Bottle Carrier With Contour End Gusset, and Pat. No. 3,204,814, for Bottle Carrier With Partition.

The cartons to be treated are of the type which contain a group of bottles, such bottles being positioned on the central, bottom panel of an elongated blank designed to be wrapped around the bottle group. There are side wall panels hinged to the sides of the central panel and upper, inclined wall panels hinged to the upper edges of the side wall panels. The inclined wall panels each carry hinged, lapping top wall panel sections secured together to form a tubuar structure. Typically, the package contains a group of six bottles arranged in two rows of three bottles each. The carton blanks are formed with relatively short or narrow panel or flange sections on the wall panel edges along the lateral edges of the blank. The flanges on the side walls are folded inwardly to be confined between the side walls and the adjacent bottle row and the panel or flange portions at the top and bottom are folded and secured at right angles to their attached walls to partially close the open tubular ends of the packages and form in effect a window at each end. The vertical panel or flange portions on the bottom panel and top panel sections are thus used to close enough of the open ends of the packages so as to exclude light from all but the labels on the enclosed bottles. Other mechanism, as disclosed in the above mentioned companion application, is employed to orient the bottles, whereby the bottles at each open end of the completed packages have their labels placed outwardly of such ends.

The foldable panels or flanges on the central or bottom panel are brought to upright positions against the vertical lower portions of the bottles and these flanges are connected at their ends by gusset fold portions to the inwardly foldable flanges on the side wall panels which are confined between their attached wall panels and the adjacent bottles at the ends of the rows. Such gusset fold portions serve to hold the flanges on the bottom panel in upright positions at the ends of the packages.

The flanges on the ends of the side walls also have gusset fold portions connected with vertical foldable panels hinged on the ends of the upper, inclined walls, and the lapping top wall sections have downwardly foldable, vertical flap portions at each of their ends arranged to be secured against the outside surfaces of the vertically positioned panels on the respective ends of the inclined walls.

A principal object of the invention is to provide a new and improved method and mechanism for folding and sealing a carton about a group of bottles.

Another object of the invention is to provide effective means for retaining a group of bottles properly centered on the central panel of the blank as the blank advances with the bottles thereon.

Another object of the invention is to provide a novel and effective means for folding up the side wall panels at the outer end portions of the blank, while at substantially the same time folding up the flanges on the edges of the bottom panel and folding inwardly the flanges on the side wall panels, and also concurrently controlling the gusset fold connecting portions between the flanges on the bottom and side wall panels so that the gusset portions, as well as the side wall flanges, will be confined between the upfolded side walls and the adjacent end bottles of the bottle rows.

Another object of the invention is to provide improved folding means for the inclined upper wall panels of the carton and improved folding and sealing means for the lapping top wall panels by the use of hot melt adhesive, or other quick setting adhesive, effectively applied to the underlying one of the two lapping top wall panel sections at an adhesive applying station, then folding the outer lapping section upon the underlying section and afterward pressing the two sections together to effect a quick attachment of the two top panel sections.

A further object of the invention is to provide an improved construction and arrangement for applying hot melt, or other quick setting adhesive, to the underlying of two lapping top wall panels while such underlying panel is supported above the tops of the bottles to be packaged, and thereafter quickly shifting the panel to which adhesive has been applied to its lowered and final position in contact with the bottle caps and quickly folding down the overlying panel onto the underlying panel.

A further object of the invention is to provide improved mechanism for quickly turning the partially completed package through an angle of 90° whereby the laterally projecting flap portions carried on the ends of the top wall panel sections may later be folded and sealed.

A still further object of the invention is to apply hot melt adhesive effectively to the laterally extending flap portions on the top wall sections and fold such sections down to secure them to the vertically folded panel portions on the upper inclined wall sections.

Additional and more specific objects and advantages of the present invention will become apparent as the description proceeds.

In the drawings:

FIG. 1 is a schematic side elevational view, showing the principal features of the mechanism on a small scale;

FIG. 1A is a schematic, side elevational view showing the driving means for various parts of the mechanism;

Figure 2B:
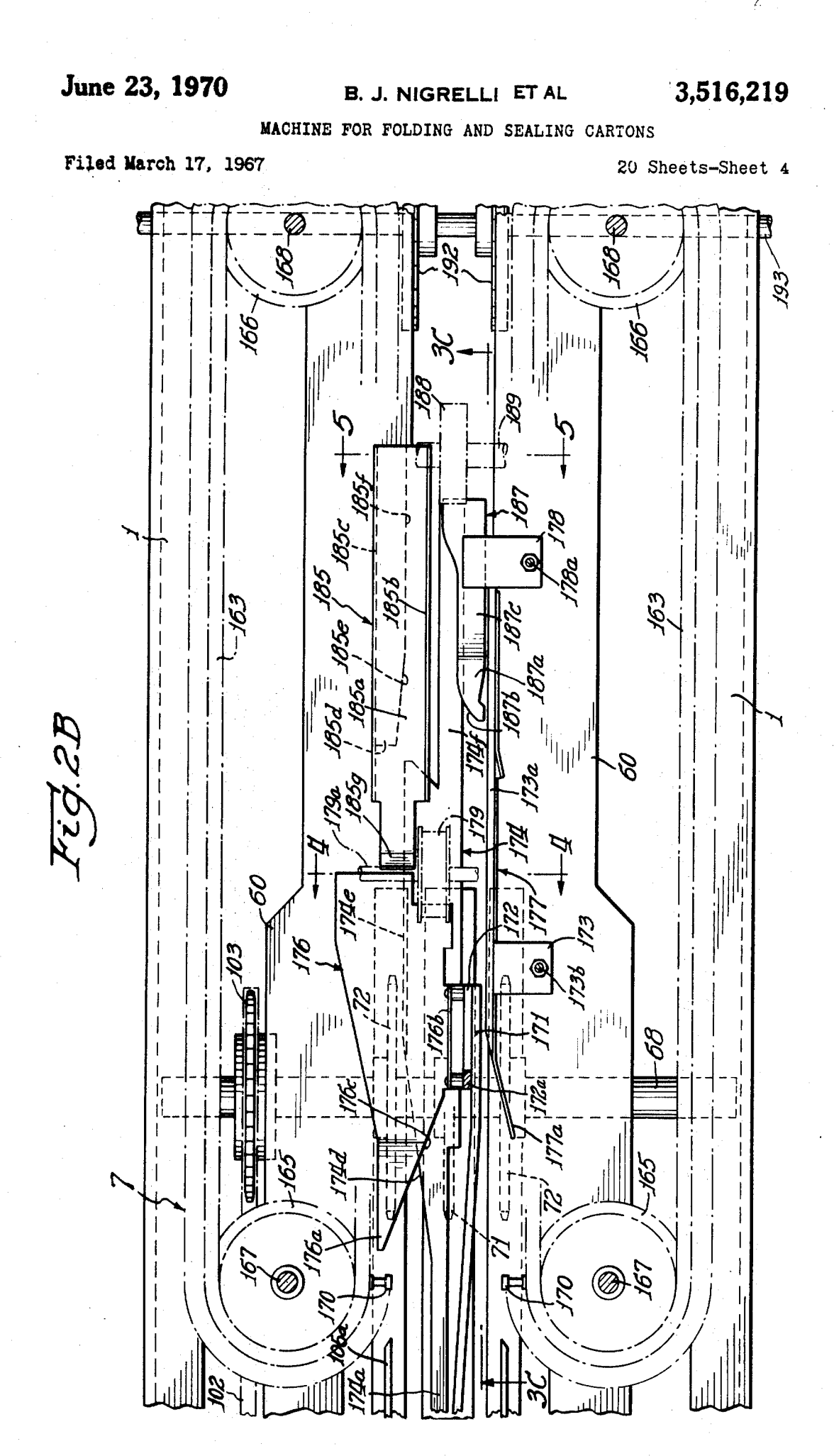
Figure 3A:
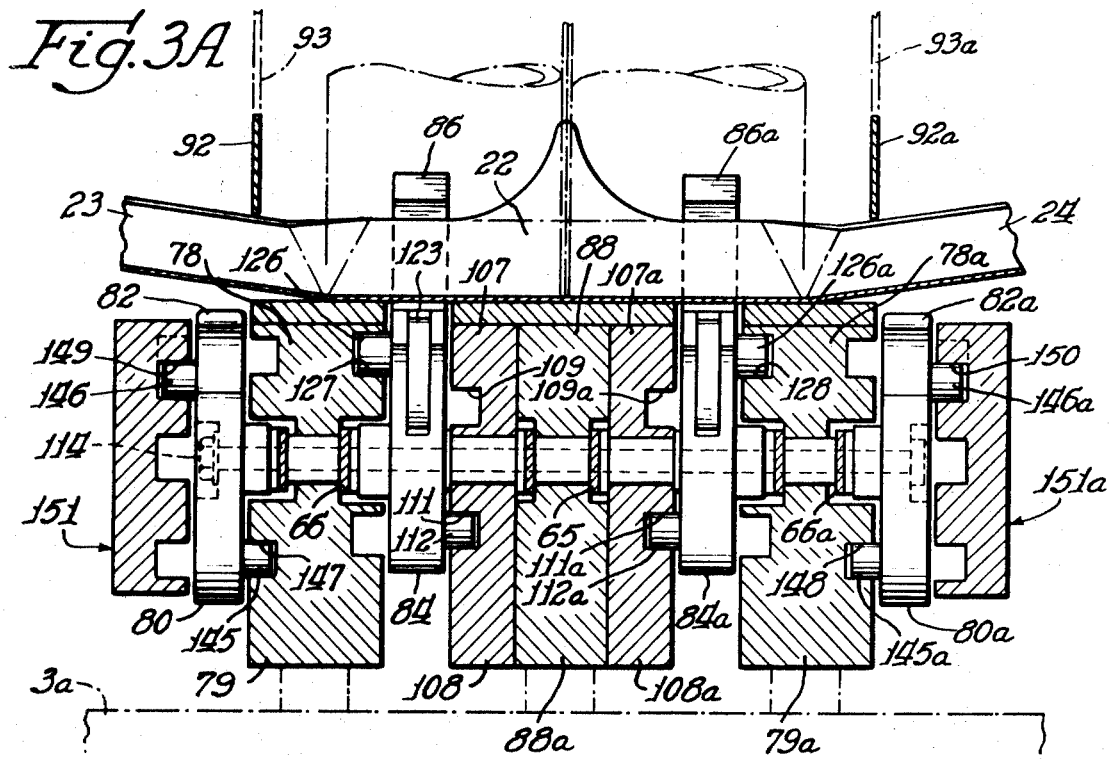
Figure 3B:
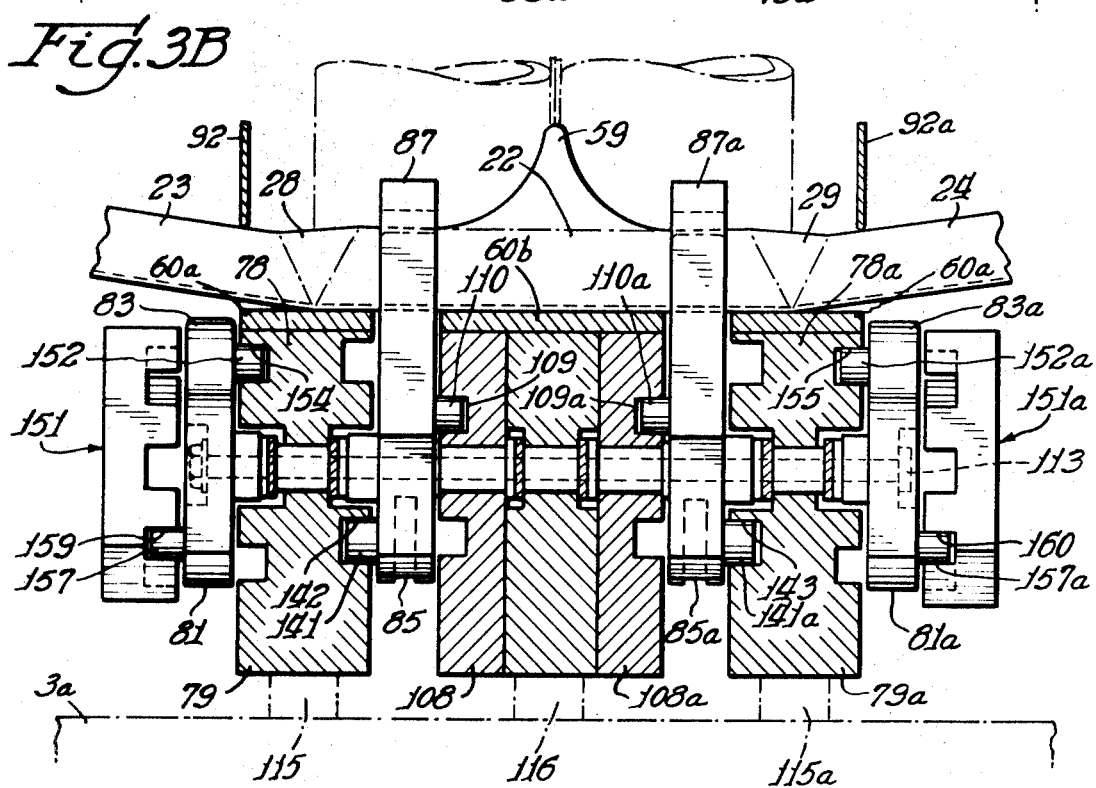
Figure 3D:
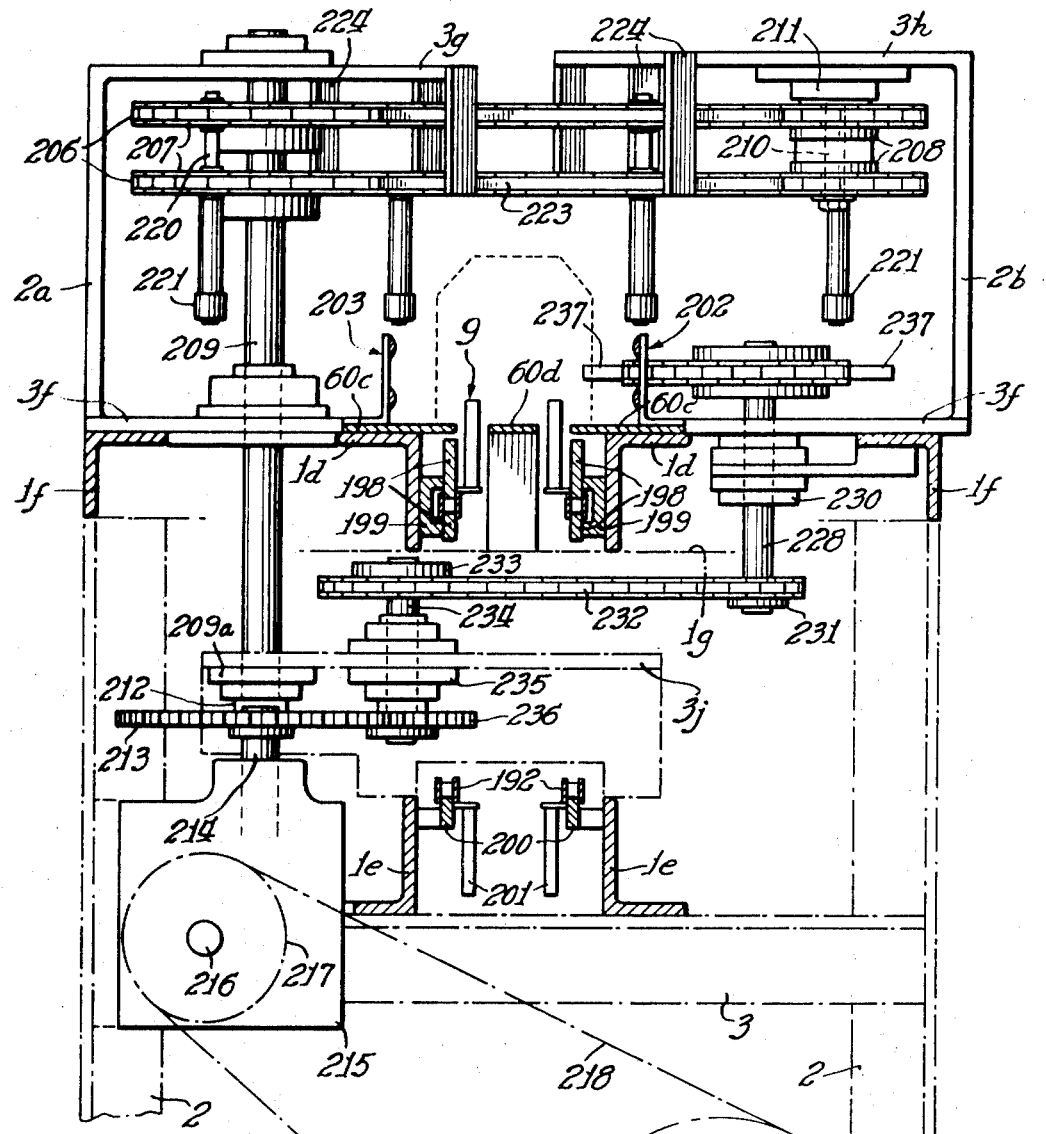

FIGS. 2, 2A, 2B, 2C and 2D when placed together, end-to-end, comprise a partly schematic, plan view of the mechanism, with certain parts omitted, and illustrate operational elements from the point where a group of bottles and a partition member have been delivered on the flat blank to the point where the finished package is discharged from the mechanism;

FIG. 3 is a partial transverse, vertical, sectional view, taken along line 3—3 of FIG. 1 and also of FIG. 12, looking in the direction of the arrows, that is, looking upstream of the machine;

FIG. 3A is a fragmentary, vertical, transverse, sectional view, taken along line 3A—3A of FIG. 12, but on a larger scale than FIG. 3, and with a number of parts omitted;

FIG. 3B is a fragmentary, vertical, transverse, sectional views on the same scale as FIG. 3A, taken along lines 3B—3B of FIG. 12, looking in the direction of the arrows, and also with a number of parts omitted;

FIG. 3C is a partial, longitudinal, vertical, sectional view taken along the line 3C—3C of FIG. 2B, looking in the direction of the arrows, showing folding and sealing elements for the carton top wall panels;

FIG. 3D is a partial, transverse, vertical, sectional view, taken along line 3D—3D of FIG. 1 and also FIG. 2C, looking in the direction of the arrows, and showing portions of the package turning mechanism;

FIG. 3E is a partial, longitudinal, vertical, sectional view taken along line 3E—3E of FIG. 2D, showing the discharge end of the machine;

FIG. 3F is a fragmentary detail, transverse, vertical, sectional view taken on line 3F—3F of FIG. 2C, looking in the direction of the arrows, and showing the tab tucking device for the triangular tabs on the end flange carried by the bottom panel;

FIG. 3G is schematic, transverse, vertical sectional view, taken along lines 3G—3G of FIG. 2C, showing the drive means for the tab tucking fingers;

FIG. 4 is a partial, vertical, transverse, sectional view, on an enlarged scale, taken along line 4—4 of FIG. 2B, and also of FIG. 3C, looking in the direction of the arrows, and showing a portion of the folding means for the carton top panels;

FIG. 5 is a partial, vertical, transverse, sectional view, on an enlarged scale taken along line 5—5 of FIG. 2B and also of FIG. 3C, looking in the direction of the arrows, and showing a portion of the top panel folding and sealing means;

FIG. 6 is a partial, vertical, longitudinal, sectional view, on an enlarged scale, taken along line 6—6 of FIG. 3, looking in the direction of the arrows, showing the bottle positioning fingers and folders for the bottom panel end flanges;

FIG. 6A is a partial, horizontal, sectional view on an enlarged scale, taken along line 6A—6A of FIG. 6;

FIG. 7 is a fragmentary, vertical, sectional view, on an enlarged scale, taken along line 7—7 of FIG. 2A, and of FIG. 3, looking in the direction of the arrows, and showing the folders for the side wall end flanges;

FIG. 8 is a partial, somewhat schematic, vertical, longitudinal, sectional view, taken along line 8—8 of FIG. 3, looking in the direction of the arrows and showing the holding fingers for centering the bottle group on the flat blank;

FIG. 9 is a partial, somewhat schematic, vertical, longitudinal, sectional view, taken along line 9—9 of FIG. 3, looking in the direction of the arrows, showing the bottle group holding fingers in a slightly advanced position from FIG. 8, and showing two of the folding fingers for folding upward the bottom panel end flanges of the blank as it travels;

FIG. 10 is a partial, somewhat schematic, vertical, longitudinal, sectional view, taken along line 10—10 of FIG. 3, looking in the direction of the arrows, showing the cam track arrangement for swinging the bottle group holding fingers out of bottle engaging relation;

FIG. 11 is a partial, somewhat schematic, vertical, longitudinal, sectional view, taken along line 11—11 of FIG. 3, showing the cam track arrangement for lowering the slidable folding fingers for the bottom panel end flanges of the blank as the blocks supporting such fingers continue to travel;

FIG. 12 is a partial, somewhat schematic, vertical, longitudinal, sectional view taken along line 12—12 of FIG. 3, looking in the direction of the arrows, showing the cam track arrangement for operating the folding fingers which control the flange sections between the gusset fold portions, such flange sections in the final form of the package lying against the carton side wall panels;

FIG. 12A is a fragmentary, vertical, longitudinal, sectional view taken along line 12A—12A of FIG. 3, looking in the direction of the arrows, showing the supplemental cam track arrangement for withdrawing the folding fingers, shown in FIG. 12, out of contact with the flange sections on the carton side wall panels;

FIG. 13 is a partial, somewhat schematic, vertical, longitudinal, sectional view, taken along line 13—13 of FIG. 3, looking in the direction of the arrows, and this view, taken together with FIG. 12, completes the showing of the folding parts for the narrow end flanges and also shows the rotary folding member for raising the carton side wall panels;

FIG. 14 is a perspective view of the carton, without bottles therein, which the machine of the present invention is designed to set up and seal around a group of bottles;

FIG. 15 is a perspective view of the partition element used to separate the bottles;

FIG. 16 is a plan view illustrating the preferred form of blank from which the carton is produced, as viewed from the inside surface of the blank;

FIGS. 17, 17A and 17B are schematic, perspective views showing several stages in the progress of the carton through the machine, and showing fragments of certain of the operating parts;

FIG. 18 is a partial plan view indicating the bottle group on the carton blank and showing the carton top sections and inclined wall panels folded to upraised position by mechanism as shown in FIG. 2;

FIG. 19 is a partial, side elevational view of the parts shown in FIG. 18;

FIG. 20 is a partial plan view of the bottle group and carton with the narrow marginal flanges of the carton in upfolded position by mechanism as shown in FIG. 6;

FIG. 21 is a partial plan view of the bottle group and carton at the point at which the folding fingers shown in FIG. 7 have folded inwardly the flange portions on the ends of the side wall panels and between the gusset fold sections;

FIG. 22 is a partial plan view, showing the partially formed package as it reaches the section of the machine shown in FIG. 2A, including parts of the machine which raise the side wall panels;

FIG. 23 is a partial plan view, with certain parts broken away, showing the partially formed package as it reaches the section of the machine shown in FIG. 2B; and FIG. 24 is a partial plan view, showing the partially formed package after adhesive has been applied to seal the top panels and with both top panels in final position, as shown in FIG. 5, the package being in position near that portion of the machine seen near the right hand end of FIG. 2B.

The mechanism of the present invention is intended for use with supplemental mechanism for placing a group of labeled bottles on a flat blank, the bottles being in two rows, such as rows of three or more bottles, and the end bottles of the rows are rotated, preferably prior to their deposit upon the blank, to place the labels on the end bottles directed outward of the row to exclude entry of light to the bottle surfaces. Other supplemental mechanism may be employed to deposit between the grouped bottles a suitable partition member to separate the bottles from each other.

As herein disclosed, the machine accepts a flat blank with a group of six bottles thereon and a partition placed between the bottles. The blanks are of elongated form and of the type which encase the bottles by being wrapped around them. The blanks carrying the bottles are conveyed transversely of their length on suitable conveying means comprising narrow spaced supporting plates along which the blanks slide, there being suitably arranged, in relation to the supporting plates, a conveyor comprising a pair of chains having upstanding lugs which travel between the spaced plates to engage the trailing edges of the blank and propel it along the plates until it reaches other propelling and manipulating means which fold the blank parts around the bottle group as the blank and bottle group assembly is further advanced.

In the present instance, the carton blank that is employed is formed with a central bottom wall panel on each side of which is hinged a side wall panel having a width, so that when upraised, its upper edge will be disposed along the inwardly curved bottle shoulders. On the upper edge of each side wall panel is hinged a wall panel designed to assume an inclined position, and the upper edges of these latter walls terminate at the tops or caps of the bottles. On the free edge of each inclined wall is a top wall section, the two top sections being of a width to overlap partially so they can be secured to each other. Along the hinge line between the inclined walls and the top sections there are formed apertures to receive portions of the outer contours of the bottle tops, typically closed with customary metal bottle caps.

The top wall sections and inclined walls are first folded upward as the assembly advances to break the scored hinge lines between the inclined walls and side walls, after which the bottle group is engaged at its ends with a set of traveling fingers to position the bottles accurately upon the blank. Flange folding fingers, traveling with the positioning fingers, then fold upward the portions of the narrow edge flanges at the ends of the bottom wall against the lower parts of the end bottles. Other pairs of flange folding fingers, traveling with the carton and bottle assembly, move up into position to engage the flange portions on the ends of the side walls. The side walls are then raised slightly, causing the end flanges on the side walls to bulge outwardly because of their gusset connections with the upraised bottom wall flanges. The flange folding fingers for the side wall end flanges then move inwardly against such flanges to swing them to inclined positions over the side walls.

The blank then advances to a pair of stationary gusset holding bars under which the gussets between the side wall flanges slide, causing the side wall flanges to remain inclined over the side walls. The side wall flange-folding fingers then move to inoperative positions.

Rotary side wall folders then swing the side walls upwardly as the carton passes the gusset holding bars. As the carton continues its advance, the side walls are held upright by guide bars and the inclined wall and top wall sections then reach folders to control such walls and sections. The leading bottle engaging fingers and leading flange folders for the bottom wall end flanges are then moved to inoperative position, leaving the trailing flange folders in position to propel the carton until it reaches a conveyor which both compresses the side walls against the bottles and propels the carton and bottle assembly. At this stage the trailing folding fingers and bottle engaging fingers are moved to inoperative positions. The outer top wall section, which is to overlie the opposite top wall section, is then guided to an outward position, out of the plane of its attached inclined wall. At the same time the inclined wall, carrying the underlying top wall section, is guided to a position somewhat spaced from the bottle shoulders. The underlying top section is then plowed down to slide along a horizontal supporting plate, keeping the underlying top section offset outwardly of its final position over the bottle group. The overlying top section, being maintained outwardly of the plane of its attached wall, will be in a position where a clear space is left for adhesive applying means to apply adhesive to the underlying top section.

As such underlying top section advances along the supporting plate, it passes beneath an adhesive applying member, and after the adhesive has been applied, the underlying top section and its attached inclined wall are moved past the supporting plate and guided laterally to their final positions. Immediately following this movement, the overlying top section is plowed down into position against the underlying top section and the assembly passes under pressure means to assure the sealing of the top sections together.

During upward folding of the side walls, the flanges at their ends have assumed positions substantially flat against the interior surfaces of such side walls and between such walls and the contours of the end bottles of the rows. Portions of the blank, connected by gusset sections to the ends of the side wall flanges and also attached to the inclined walls, are brought to vertical positions at the ends of the partially formed package. Other flap portions of the blank, carried independently on the top wall sections, remain extended outwardly in the planes of such top sections ready to be folded down and sealed to the vertically disposed portions attached to the inclined walls and held in place by the gusset connections with the flanges carried by and folded substantially against the side walls.

The partially formed package is then advanced by a lug chain conveyor to a turning device which turns the package through an angle of 90°. As the package is propelled by the lug chain conveyor, transversely of the package length, it passes a pair of tab tucking devices, one at each end of the package, each of which depresses a triangular tab on each bottom wall end flange and tucks the pointed end of the tab beneath downwardly directed abutment surfaces on the partition member that is in place between the bottles.

Further movement of the packages brings them to adhesive applying devices which applies quick-setting adhesive to the under sides of the flap portions extending from the top wall sections. These flap portions are immediately plowed down to final position against the vertical panel portions carried by the inclined walls and the package then passes along between pressing devices to apply lateral pressure to the downfolded flaps to hold them in position until the adhesive has set.

The completed packages are then advanced by the lug chain conveyor to another conveyor, such as a set of gravity rolls, by which the packages are conducted away from the machines.

Referring more particularly to the drawings, the machine is supported on a suitable base frame having longitudinal members 1, 1, vertical members 2, 2 and transverse members 3, 3, a number of which are not shown for the sake of simplicity of illustration.

Suitably supported on the frame is a primary or first conveyor, indicated as a whole at 4, arranged to deliver conveyor blanks 5 to devices performing carton treating operations. The conveyor 4 may be arranged to receive loaded blanks with partitions placed between the bottles from machines located upstream from the present machine, or, conceivably, the blanks could be loaded by hand while on the first conveyor.

The first conveyor 4 is arranged to deliver loaded blanks to what may be termed a gusset fold conveyor, indicated as a whole at 6, upon which the narrow edge panel or flange portions are folded and the side wall panels are brought into upright position. It will be noted that conveyors 4 and 6 run together for a short distance while conveyor 4 propels the blank until propulsion of the blank is taken over by elements on conveyor 6.

From the conveyor 6 the partly assembled package, with its side walls folded up vertically along the bottle group, passes into the control of a lateral pressure applying conveyor, indicated as a whole at 7, to propel the package through a section for folding and sealing the top wall panels, the adhesive applying device being indicated as a whole at 8.

After the top wall panels are sealed, a lug chain conveyor, indicated as a whole at 9, propels the package into a turning device, indicated as a whole at 10, where the package is turned through an angle of 90°, after which the lug chain conveyor 9 propels the package past devices, indicated as a whole at 11, 11a where a pair of rotating fingers engage the triangular tab on each of the lower end flanges of the carton to fold down such tabs and cause them to snap into engaged condition below downwardly directed edges of the partition member.

The lug chain conveyor 9 continues to propel the package to move it past additional adhesive applying devices, indicated as a whole at 12, 12, where adhesive is applied to the under surfaces of the panel portions which are projecting at the ends of the top wall panels.

Following the adhesive applying devices 12, 12, the packages pass between pressure applying devices, indicated as a whole at 13, 13 which apply lateral pressure on the down-folded panel portions until the adhesive has set. The package is then complete and is discharged from the machine on the discharge section indicated as a whole at 14.

The carton, indicated as a whole at 15 (see FIG. 14) is preferably formed from a single paperboard blank, herein shown with its inside surface facing up. The carton (see FIG. 16) comprises a bottom panel 17, side wall panels 18 and 19 and inclined panels 20 and 21 hinged on the upper edges of the side wall panels. Top panels 20a and 21a are hinged respectively to inclined panels 20 and 21 and are arranged to be secured in overlapping relation. Extended flange portions on panels 17, 18, 19, 20 and 21 are indicated respectively at 22, 23, 24, 25 and 26 and are integrally joined by foldable gusset portions defined by score lines. Between the extended flange sections 22, 23 and 24, the gusset fold sections, indicated at 28 and 29, respectively are V-shaped and symmetrically disposed relatively to the score lines indicated at 30 and 31, defining the lines of fold between wall panels 17, 18 and 19. The lines of fold between the extended flange sections and their attached wall panels are indicated at 32, 32.

Between the extended flange sections 23 and 25 and their counterparts 24 and 26, the gussets, indicated at 33 and 34, respectively, are defined along one side by score lines which are extensions of the score lines, indicated at 35 and 36, between wall panels 18 and 20 at one end of the blank and wall panels 19 and 21 at the other end. These extended score lines are indicated at 35a and 36a, respectively, and provide lines of fold between extended flange or panels sections 25 and 33 and their counterpart sections 26 and 34. The lines of fold between flange section 23 gusset 33, and between flange section 24 and gusset 34, are formed by score lines indicated respectively at 37 and 38. The angles between the fold lines 37 and 35a and between fold lines 38 and 36a are the same, as herein indicated.

Irregularly shaped, extended panel sections are formed at the ends of the top panels 20a and 21a, indicated at 39 and 40 on panel 20a, and at 41 and 42 on panel 21a. The extended panel sections 39 and 25 and extended panel sections 42 and 26 are separated by slits 43 and 44 respectively. At the opposite side of the blank, sections 40 and 25 and sections 41 and 26 are separated by slits 45 and 46, respectively. These slits terminate at the longitudinal fold lines 32, 32, and meet the ends of the respective transverse fold lines 47 and 48 along which panels 20a and 21a are hinged to their attached inclined panels. The angles of these slits are chosen to conform to the angle of inclination of the inclined panels when the carton is set up.

The top panels 20a and 21a are formed with U-shaped cuts to provide registering finger openings. The tabs formed by the cuts are folded inwardly of the carton and are arranged to swing down between the bottle necks.

A weakened tear line, formed of angular spaced slits, is located in each top panel and positioned just outside the edges of the companion lapping panel so as to be in single-thickness material. These weakened lines are indicated at 49 and 50. Top panel 20a overlies top panel 21a, and panel 20a is formed with a displaceable pull tab 49' extending into panel 40 from its hinge connection with its panel 20a. The slits defining the line of tear in panel 20a extend to the outer edge of the pull tab 49' to facilitate starting the tear. At the other side of the blank the slits extend to the edges of panels 39 and 42. At the end of panel 21a the tab 41 is suitably cut away to be clear of the pull tab when the carton is set up.

Die cut openings 51, 51 and 52, 52 are formed along respective fold lines 47 and 48 to allow portions of the bottle caps to extend therethrough, holding the upper ends of the bottles firmly in the carton.

As will be later explained, two lines of adhesive are applied to one of the top panels, in the present instance the underlying panel 21a. These adhesive lines are applied so that when the top panel sections are brought into lapping relation the adhesive lines will be disposed along the respective free edges of the top panel sections. Thus, the adhesive lines will be disposed inside the lines of tear, thereby allowing the portion of the composite top wall which is of double thickness to be torn out from such composite top wall.

When the adhesive has been applied to the top wall panel 21a, and adjoining panels 41 and 42 and panel 20a and adjoining panels 39 and 40 are pressed down upon the first mentioned group of panels, there will be in effect two downwardly foldable, composite panel sections extending horizontally outward from the top wall. One composite section comprises attached panels 39 and 42 and the other section comprises attached panels 40 and 41.

When the flange portions 23, 23 and 24, 24 are brought into position next to their attached side walls 18 and 19, as shown in FIG. 14, the gusset sections 33, 33 joining both sets of panels 23, 23 and 25, 25 will pull panels 25, 25 into substantially vertical position. Likewise panels 26, 26 will be pulled to substantially vertical position. Thus, when the composite panel sections 39, 42 and 40, 41 are ready to be folded down, after the top panels 20a and 21a have been secured together, the panels 25, 25 and 26, 26 will be in vertical position to allow such respective composite panels to be adhesively secured to the vertically disposed panels.

The partition member, indicated as a whole at 54, may be formed similar to that described in Pat. No. 3,204,814, referred to above. This partition member essentially comprises an elongated central panel portion 55 to extend lengthwise of the bottle rows and transversely extending portions 56, 56 and 57, 57a. The portion 57a has an upwardly extending part 57b the top edge of which terminates closely beneath the underside of the top wall of the carton to assure that the partition will rest upon the carton bottom wall and keep the lower portions of the bottles out of contact with each other. The upper edges of the transverse portions extend upward sufficiently to be substantially equal in height to the point at which the shoulders of the bottles curve inward and thus no partitioning above this height is necessary.

The partition 54 has downwardly directed abutment surfaces 58, 58 at the outer lower corners of the central panel portion 55 formed by cutting a small rectangular piece from the corners. These abutments are for the purpose of retaining the apexes of the triangular tabs 59, 59, each formed as a part of the flange 22 hinged on each end of the bottom panel. The construction is such that the triangular tabs may be swung down, first contacting the vertical edge of the partition, then passing beyond the abutment edge with a snap action so that, when released, the apex of the tab will be retained against the under surface of the abutment. This tab serves to exclude light from entering between the end bottles in areas below the labels.

The primary conveyor 4 serves to propel the loaded blanks past folding means for swinging upward the end portions of the balnks, and the gusset fold conveyor 6 continues the advance of the blanks and serves to fold the narrow flanges at the open ends of the carton and to fold upward the blank side walls.

Referring to FIGS. 2, 2A, 3, 8, 12, 13, 18 and 19, the loaded flat blanks 5, 5 are delivered on the primary lug chain conveyor 4 comprising spaced chains 61, 61 having upstanding lugs 62, 62. As the blanks are conveyed they are slidably supported on horizontal side plates 60, 60 and narrow, spaced intermediate plates 60a, 60a and center plate 60b. The lugs 62 and other operating parts extend upwardly through the spaces between these plates.

The chains 61 pass around suitable tail sprockets, not shown, on the upstream end of the conveyor 4 and around head sprockets 63, 63 fixed on a driven shaft 64 journalled in the longitudinal frame members 1, 1. The shaft 64 has fixed thereon a sprocket 63a (see FIG. 1A), driven by a sprocket chain 63b passing around sprocket 63c, fixed on a short shaft 63d, carrying a bevel gear (not shown), meshing with a similar bevel gear (not shown), fixed on line shaft 73.

A cooperating set of three chains, forming a part of the gusset fold conveyor 6, comprises a center chain 65 and laterally related chains 66, 66a. See FIGS. 2 and 3. These chains pass around tail sprockets fixed on shaft 67 and head sprockets fixed on shaft 68. See FIG. 13. The center tail sprocket is indicated at 69 (see FIG. 2) and the laterally related tail sprockets are indicated at 70, 70. The center head sprocket is indicated at 71 (see FIG. 2B) and the laterally related head sprockets are indicated at 72, 72.

The shaft 68 is driven by means to be described presently, and the speed of rotation of the shaft is fixed so that the chains 65, 66, 66a are advanced in synchronism with the travel of the lugs 62, 62 on the chains 61, 61, whereby loaded blanks will be delivered properly to the parts operated by chains 65, 66, 66a. These parts will presently be described.

Prior to the transfer of the loaded blanks to the operating parts carried by chains 65, 66, 66a, the lugs 62 on chains 61 contact the edges of the side flanges 23 and 24 and advance the loaded blanks to a folding section to swing upwardly the end portions of the blank along fold lines 35 and 36. For this purpose the blank is carried beneath a pair of hold-down bars 74, 74a, the outer edges of which are aligned substantially with the fold lines 35 and 36. See FIGS. 2, 12, 18 and 19.

After the leading edge of the blank moves a short distance beyond the upstream end of the hold-down bar the panels 20 and 21 of the blank ride up along inclined plow elements, indicated at 75, 75a (see FIGS. 2, 18 and 19), supplemented by additional folding elements 76, 76a, at the sides of the conveyor path, to raise the two joined end panels at each end of the blank in a single plane. The raised panels continue to be held upright by guide plates 77, 77a. See FIGS. 1, 2 and 18 to 21.

As soon as the trailing edge of the blank is carried past the receiving end of the gusset fold conveyor 6, the operating parts on this conveyor will have been moved into positions below the blank preparatory to taking over the propulsion and further folding of the blank and, when the pusher lugs 62 on chains 61 pass down around sprockets 63 such lugs drop out of contact with the blank edges.

FOLDERS FOR SIDE WALL END FLANGES

The outer chains 66, 66a are guided between upper and lower sets of guide bar sections 78, 79 and 78a, 79a, see FIGS. 3, 3A and 3B, and the chains 66, 66a carry on their respective outer sides, pairs of trailing and leading block members 80, 80a (trailing) and 81, 81a (leading) on which are fixed trailing and leading folding fingers 82, 82a (trailing) and 83, 83a (leading). See FIGS. 3, 3A, 3B, 7, 12, 12a, 13, 20 and 21. In FIGS. 12 and 13, for simplicity, a number of the folding fingers are omitted.

The individual block members of the pair 80, 80a, and the pair 81, 81a are identical but reversed.

The block members 80, 80a and 81, 81a are arranged to be swung or oscillated, as they advance, to bring their fingers 82, 82a and 83, 83a from lower inoperative positions to raised, operative positions and then back to inoperative positions, as will be seen by comparison in FIGS. 12 and 13. The fingers 82, 82a and 83, 83a extend upwardly from the ends of the blocks 80, 80a and 81, 81a, respectively, and are curved inwardly toward each other at their extremities.

As best shown in FIGS. 7, 12 and 13, the block members at all times move in a plane below the bottom panel of the blank and the fingers 82, 82a and 83, 83a curve around the edges of the blank to engage and fold inward the flange portions 23, 23 and 24, 24 extending from side walls 18 and 19 of the blank. See FIGS. 20 and 21. The cam track and follower mechanism for controlling fingers 82, 82a and 83, 83a will be described presently.

BOTTLE POSITIONING FINGERS

Means are provided for holding the bottle group properly positioned between fold lines 32, 32 at the ends of the bottom panel of the blank. For this purpose the center chain 65, operating between chains 66 and 66a has attached to its sides a series of sets of trailing block members 84, 84a and leading block members 85, 85a. For simplicity of illustration, only a limited number of these block members are shown. See FIGS. 8, 9, 10 and 11. The individual block members of the pair 84, 84a and the pair 85, 85a are identical but reversed. The chain 65 is guided between upper and lower guide bars 88 and 88a, as best shown in FIG. 3.

Extending from the block members 84, 84a and 85, 85a respectively, are integrally formed, trailing and leading angular fingers 86, 86a and 87, 87a. See FIGS. 3, 3A, 3B, 6, 8, 9, 10, 11, 20 and 21. As shown in FIGS. 6, 20 and 21, the ends of fingers 86, 86a and 87, 87a extend inwardly toward each other to engage the end bottles of the rows and are shaped to fit the bottle contours so that, when brought against the end bottles, the fingers will tend to urge the engaged bottles inwardly into firm contact with the partition. The cam track and follower arrangement for controlling the fingers 86, 86a and 87, 87a will presently be described.

The blocks 84, 84a and 85, 85a are propelled by the chain 65, as above stated, which passes around the center sprocket on shaft 67. The blocks are guided so that the bottle engaging fingers move in a path below the bottom panel of the blank until they have travelled a short distance beyond the shaft 67. The trailing and leading blocks are then swung to bring the trailing and leading fingers 86, 86a and 87, 87a into contact with the bottles. The construction of the fingers maintains their upright portions out of contact with the blank and, at the time of contact and for a brief period thereafter, the blanks continue to be propelled by the lugs 62 on chains 61. Thus, if the bottle group is somewhat displaced from an accurate position between the fold lines 32, 32 of the blank, the bottles will be shifted and then held in proper position by the fingers 86, 86a and 87, 87a.

The trailing fingers 82, 82a carried by blocks 80 and 80a and the leading fingers 83, 83a carried by blocks 81, 81a are moved along with the blocks 84, 84a and 85, 85a, but their fingers remain for a short period below the level of the blank bottom panel, as best shown in FIG. 8. When the blank reaches a position just beyond shaft 67, the fingers 86, 86a and 87, 87a are concurrently swung into bottle engaging position and remain so positioned until a short distance before their blocks 84, 84a and 85, 85a reach a position near the head sprocket on shaft 68. See FIG. 10.

FOLDERS FOR BOTTOM WALL END FLANGES

After the fingers 86, 86a and 87, 87a have been swung up and have engaged the bottles, the narrow flanges 22, 22 at the ends of the bottle panel are swung to vertical position. For this purpose trailing and leading pairs of vertically movable folding fingers 89, 89a and 90, 90a are slidably mounted on the respective trailing and leading blocks 84, 84a and 85, 85a. See FIGS. 6, 10, 12 and 13. It is to be noted, however, that these figures show only the parts that can be seen looking at the machine from its left hand side, as seen in FIG. 3. The slidable fingers 89, 89a and 90, 90a have bevelled, upper ends inclined inwardly, downwardly toward the edge of the bottom panel of the blank, when in raised position, so that the upper tapered edges of the fingers will first contact the outer edges of the narrow flanges 22, 22 and swing them smoothly to raised position. The control means for the fingers 89, 89a and 90, 90a will presently be described.

Reviewing the initial sequence of the operations, the lugs 62 propel the loaded blanks along the supporting plates 60, 60a and 60b. The end portions of the blank pass beneath holddown bars 74, 74a and the folding plows fold upward the respective joined top panels and inclined panels 20, 20a and 21, 21a in a single plane until they are brought to upright positions by plows 76, 76a. These panels are then retained upright by guide plates 77, 77a. See FIG. 2. At a brief distance beyond the upstream ends of guide plates 77, 77a and past the receiving end of the gusset fold conveyor 6, the ends of the bottle group are engaged by the upwardly swung fingers 86, 86a and 87, 87a. See FIG. 8. The vertically slidable fingers 89, 89a and 90, 90a then rise to fold upwardly the narrow flanges 22, 22 at the ends of the bottom panel 17, thus removing the edges of these flanges from the lugs 62, 62 which, shortly thereafter, are carried by their chains 61, 61 down and around the head sprockets 63, 63. See FIG. 12. The propelling control for the blank is thereafter for a limited distance effected by the trailing fingers and accordingly they become a second conveyor means. The fingers 82, 82a and 83, 83a, carried alongside the respective fingers 86, 86a and 87, 87a, are then swung up to positions ready to fold inwardly the flanges 23, 23 and 24, 24 at the ends of the side walls. See FIGS. 12 and 20.

FOLDERS FOR SIDE WALL END FLANGES

When the blank reaches the position shown in FIG. 12 the edge portions of the blank side walls 18 and 19 are lifted slightly by sliding up over the inclined ends of longitudinal plow bars 91, 91a. See FIGS. 2a, 3 and 12. This causes outward bowing of the flanges 23, 23 and 24, 24, as shown in FIG. 20.

After the blank has advanced far enough so that the edges of the side walls are fully supported on the plow bars 91, 91a, the fingers 82, 82a and 83, 83a are swung further inwardly. See FIG. 7, showing only fingers 82 and 83, and FIG. 12 showing these inwardly swung fingers in broken lines. This brings the flange portions into inclined positions over their attached side wall panels.

GUSSET HOLD DOWN BARS

After further advance of the blank a short distance it moves below gusset hold-down bars 92, 92a (see FIGS. 3, 12 and 21) supported on depending members 93, 93a, attached to longitudinal frame portions, one of which is shown at 1a in FIG. 12.

The gusset hold-down bars are relatively thin and engage the inner ends of the flange portions along the line of fold between these flanges and their connected gusset portions 28 and 29 to hold the flange portions inwardly inclined over their attached side walls after the fingers 82, 82a and 83, 83a are withdrawn. As indicated partially in FIG. 12, showing only fingers 82 and 83, the fingers 82, 82a and 83, 83a are swung outward and downward below the bottom panel of the blank as soon as the blank has moved fully beneath the gusset hold-down bars 92, 92a. As related to FIG. 2A, the withdrawing action of the fingers 82, 82a and 83, 83a occurs during a short movement within the area on which section line 3—3 is taken in FIG. 2A.

The bottle-engaging fingers continue in contact with the bottles and the vertically movable folding fingers continue in contact with the upwardly folded flanges for a short distance beyond the point of withdrawal of the fingers 82, 82a and 83, 83a as best indicated in FIG. 12, showing only fingers 82 and 83.

UPWARD FOLDING OF BLANK SIDE WALLS

Immediately after the folding fingers 82, 82a and 83, 83a are withdrawn and before the blank passes beyond the ends of the gusset hold-down bars, the side walls 18 and 19 of the blank are folded upward. For this purpose two rotary, wall-folding disks or wheels are provided, indicated at 95, 95 (see FIGS. 1, 2A, 3 and 13) carrying thereon oppositely related wall engaging and folding extensions 96, 96. The folding wheels are mounted on a shaft 97 journalled in the side frame members 1, 1. The drive means for shaft 97 comprises a sprocket wheel 98 (see FIGS. 1A and 2A) over which passes a sprocket chain 99. This chain passes in turn around a sprocket 100, fixed on driven shaft 64.

Near the opposite end of shaft 97 from the sprocket wheel 98 is fixed a sprocket wheel 101. Passing around sprocket wheel 101 is a sprocket chain 102 which extends forwardly and passes around a sprocket wheel 103 on shaft 68 for the purpose of driving such shaft. See FIGS. 1A, 2A and 2B.

As viewed in FIGS. 1 and 13, the rotation of the folding wheels is clockwise and the angular position in which each folding wheel is fixed on shaft 97 is such that the curved leading portion 96a of one of the folding extensions 96 will swing into position while the blank is still traveling along the gusset hold-down bars 92, 92a and will engage and swing upward the side wall panels 18 and 19 of the blank as it advances. This movement brings the gusset portions 28, 28 and 29, 29 up more closely against the lower parts of the adjacent end bottles of the group and brings the narrow flanges 23, 23 and 24, 24 into a smaller angular relation to their attached side walls.

The two folding-extensions 96, one on each folding wheel, thus move along with the respective opposite side walls of the carton blank until the walls are brought under the control of side wall folding plows 104, 104 and 105, 105. See FIGS. 1, 2A and 13. The folding extensions of the folding wheels then pass downward leaving the side walls in upraised position and in control of the plows. These plows are supported on brackets 106, 106 attached to the plates 60, 60.

After the side walls have been folded to substantially vertical positions along the bottle groups by the folding plows, they are held in such positions until the partly formed packages reach the two-section, traveling, side presser conveyor, indicated as a whole at 7 in FIGS. 1, 2B, 10, 11 and 13.

As indicated in FIGS. 10 and 11, before the partly formed package reaches the side presser conveyor the leading bottle engaging fingers 87 and 87a, together with slidable fingers 90, 90a, are swung clear of the bottles and narrow flanges of the carton, while the bottle engaging fingers 86, 86a and flange engaging fingers 89, 89a, continue their contact and are not withdrawn until the partly formed packages move in between the sections of the side-presser conveyors.

CAM FOLLOWERS AND CAM GROOVES FOR BOTTLE POSITIONERS AND FLANGE FOLDERS

The cam guide and follower devices for the fingers 82, 82a; 83, 83a; 86, 86a; 87, 87a; 89, 89a; and 90, 90a will now be described. The inward swinging movement, the upward sliding of the end flange folders 89, 89a and 90, 90a, and the holding and later withdrawal of these parts are controlled by short cam follower pins extending laterally from the finger-supporting blocks, so that they may travel within cam tracks or grooves formed in the sides of the chain guide bars and in other plates or bars secured along the paths of the chains 65, 66 and 66a, as best indicated in FIGS. 3, 3B, 3C, 6 and 7, and also indicated schematically in FIGS. 8 to 12, 12A and 13.

Control means for bottle positioners

The control means for the leading and trailing bottle-positioning fingers will first be described. Extending along the vertically related guide bars 88 and 88a, for the center chain 65, there are secured what may be termed upper or outside guide bar sections 107 and 107a located above the turning axes of the block members 84, 84a and 85, 85a, and below these guide bar sections are arranged lower or inside guide bar sections 108 and 108a. The guide bars 107 and 107a are formed with cam grooves 109 and 109a, respectively, to receive the respective cam follower pins 110, 110a, secured on the leading bottle-positioning blocks 85 and 85a, such pins extending laterally inward toward the chain 65 (see FIGS. 3, 3A and 3B) and being located above or outside the turning axes of the blocks.

The lower guide bars 108, 108a, located along the lower guide bars for chain 65 are formed respectively with cam grooves or tracks 111, 111a to receive cam follower pins 112, 112a, secured on the trailing block members 84 and 84a and extending laterally inward toward the center chain 65 and inside the turning axes of the blocks. See FIGS. 3 and 3A. Also see FIG. 6, taken along section line 6—6 of FIG. 3, and FIG. 6A, taken along section line 6A—6A of FIG. 6.

The turning axes of the leading block members 81, 81a and 85, 85a are in alignment and, likewise, the turning axes for the trailing block members are in alignment. The pivots for the leading and trailing block members may be single pivot rods, indicated at 113 and 114, respectively, such rods being received within links in the three chains 65, 66 and 66a and serving in effect as one of the link pivots of each chain. See FIGS. 3, 6, 6A and 7.

It is to be understood that the guide bars for the chains 65, 66 and 66a and the bars formed with cam track grooves are suitably curved around the end sprockets for the chains to keep the carton and bottle engaging elements under control as they pass from one level to another.

As shown in FIG. 3, the guide bars 79, 88a and 79a are supported on supplemental supporting members 115, 116 and 115a resting upon transverse frame members, one of which is indicated at 3a, supported on additional transverse frame members, one of which is indicated at 3b.

Control means for end flanges on bottom walls

The construction and control mechanism for the flange folding fingers 89, 89a and 90, 90a will now be described. These fingers are narrow and elongated and are constructed with side flanges so as to be retained within guides formed on the blocks 84, 84a and 85, 85a which support the bottle engaging and positioning fingers. Referring first to the trailing fingers, these are identical in form and in manner of operation, but reversed. A description of one of these trailing fingers namely finger 89, as shown in FIGS. 6 and 6A, is believed to be sufficient. Flanges 117, 117 at opposite sides of the finger embrace relatively wide rib portions 118, 118 on opposite sides of a slot 119 formed in the block 84 to guide the fingers parallel with the neck portion of finger 86.

The block 84 has a U-shaped, cut-out section 120 above its pivotal connection with pivot pin 114. One side of the cut-out section parallels the guide slot 119, and the other side is defined by a two-pronged, upstanding portion 121 having extended through and between them a pivot pin 122 upon which is pivoted a finger operating lever 123, arranged to oscillate in a vertical plane. The free end of the lever extends to the finger 89 and, at such free end, the lever has a slotted opening 124. The slotted free end of the lever projects into a vertically extending opening or groove formed in the leading face of the finger, such opening or groove being directed toward the upstanding portion 121 of the block 84. A pin 125 is secured through the finger 89 and extends across the groove therein at right angles to the vertical dimension of the finger. See FIG. 6A. The slotted opening in the lever engages above and below the mid-portion of the pin 125, and the arrangement is such that swinging of the lever in a vertical plane will move the finger 89 up and down.

The lever 123 has fixed thereon a laterally projecting, cam follower pin 126 midway of its length and located so that it may move freely in a vertical path within the cut-out portion 120, so that the lever may be swung down far enough to withdraw the upper end of the finger 89 below the path of travel of the carton blank. The follower pin 126 is arranged to travel within cam groove 127. See FIGS. 3, 3A and 9. The counterpart follower pin 126a for the lever carried by block 84a is arranged to travel within cam groove 128 which is identical to cam groove 127 but reversed.

Referring next to the leading folding fingers 90, 90a, these are also identical in form and in manner of operation, but reversed. A description of one of the leading folding fingers and operating parts, namely leading finger 90, is believed to be sufficient.

The folding fingers 90, 90a are longer than the fingers 89, 89a, due to the fact that their control elements are below the pivot of the supporting blocks 85, 85a, instead of above the supporting block pivots, as in the case of the control elements for fingers 89, 89a. As shown in FIG. 6, the upper part of the main portion of the block 85 is formed with a vertical rectangular shaped opening on each side of which are relatively wide rib portions 130, 130. See FIG. 6A. Embracing these rib portions are side flanges 131, 131 which extend only partially downward along the finger 90. The upper portion of the finger 90 is thus slidable within the vertical opening defined by the ribs 130, 130. This opening terminates at a level above the pivot rod 113 and a lower, vertically extending opening is formed in the block 85, aligned with the upper opening, but terminating at a level below the pivot rod 113, leaving a connecting portion 132 joining the two sections of the block.

The lower portion of the finger is bifurcated to provide spaced sections slidable along opposite sides of the connecting portion 132. The lower opening in the block 85 thus forms two downwardly projecting prongs 133 and 134. The prong portion 133 has a rib part 135 embraced by extended parts of the flanges 131 on the leading edge of the finger 90.

The block 85 has a further downwardly projecting portion 136 generally parallel with the prong portion 134. Both the portions 134 and 136 are bifurcated to provide a vertical guideway to receive a finger operating lever 137. One end of the lever is pivoted on a pin 138 passing through the bifurcated, depending portion 136. The free end of the lever has an elongated slot 139 to receive a pin 140, secured through the bifurcated lower portion of the finger 90, the arrangement being such that when the lever is swung up or down the finger 90 will be raised or lowered. The lever 137 has fixed thereon a laterally projecting, cam follower pin 141. When the follower pin is lifted to raised position it may move freely within the openings provided between the downwardly extending portions 134 and 136. The cam follower pin 141 is arranged to travel within cam groove 142. See FIGS. 3, 3B and 9. It is to be noted, however, that FIG. 9 shows cam follower pin 141a and groove 143, which are the counterparts of follower pin 141 and groove 142, to control finger 90. See FIGS. 3, 3A and 3B.

OPERATION OF BOTTLE POSITIONERS AND FOLDERS FOR BOTTOM WALL FLANGES

The cam groove construction for the various bottle positioning and flange folding parts will now be described. Referring to the bottle positioning fingers, FIGS. 8 and 10, taken along lines 8—8 and 10—10 of FIG. 3, show the trailing and leading fingers 86 and 87; and FIGS. 9 and 11, taken along lines 9—9 and 11—11 of FIG. 3, show trailing and leading fingers 86a and 87a. The respective FIGS. 8 and 10 and FIGS. 9 and 11, when placed in alignment show schematically the various cam grooves for swinging the blocks on which the bottle positioning fingers are carried and the cam grooves for the vertically slidable flange folding fingers, through the full length of the upper runs of their propelling chains. The guide channels for the chains 65, 66 and 66a are omitted in these views in the interest of simplifying the illustration. The description of a single set of cam grooves is believed to be sufficient for the reason that the companion set is identical, except in reverse, as indicated in FIG. 3.

Movement of bottle positioners to holding position

FIG. 8 shows the progression of the movement of the blocks 84 and 85 to bring their fingers from inoperative positions to bottle engaging positions as the blocks advance. Both blocks 84 and 85 are arranged to swing so as to bring their fingers simultaneously into contact with the bottles.

The following description of the follower pins and cam grooves for the control of the blocks carrying the bottle positioning finger is limited to blocks 84 and 85 and their controlling parts. It is to be understood that the counterpart mechanism for the control of blocks 84a and 85a is identical, but reversed, and it is believed that a description of one set of these parts will suffice. The cam groove 111 for the follower pin 112 on block 84 has a section extending in an arcuate path, indicated at 111b, located around the sprocket for chain 66 mounted on shaft 67. The cam follower 112 after moving through section 111b enters a horizontal groove section, indicated at 111c. This section is relatively short and serves to maintain the block 84 for a brief duration of movement in position so that its finger 86 will travel just below the path of travel of the carton blank. The horizontal section 111c of the cam groove joins a short upwardly inclined section 111d which then joins with a long horizontal section 111e. Movement of the cam follower 112 up the inclined section 111d of the cam groove will swing the block 84 in a clockwise direction to bring its finger 86 into contact with the outer, trailing bottle in the adjacent row of the bottle group. Movement of the cam follower 112 in the long horizontal section 111e of the cam groove retains finger 86 in bottle holding position as the bottles travel with the carton blank. Withdrawal of the fingers 86 and 86a from bottle contact will be described presently.

Referring to cam groove 109 for block 85, carrying the finger 87, the cam groove has an arcuate section 109b, see FIG. 8, which is located outside the arcuate cam groove section 111b. The arcuate section 109b joins with a horizontal section 109c, which extends farther than the upwardly inclined section 111d, and joins with a short, downwardly inclined section 109d having a length comparable with that of the upwardly inclined section 111d. The short, inclined section 109d then joins a long horizontal section 109e. Movement of the cam follower 110 along the downwardly inclined section 109d will swing the block 85 in a counter-clockwise direction to bring its finger 87 into contact with the adjacent, outer leading bottle of the bottle group. The movement of the cam follower 110 in the long horizontal section 109e of the cam groove then retains finger 87 in bottle-holding position as the bottles travel with the carton blank. The withdrawal of the fingers 87 and 87a from bottle contact will be described presently.

Movement of folders for bottom panel flanges to folding position

The upward movement of the vertically slidable flange folder fingers 89, 89a and 90, 90a will now be described. Reference is now made to FIGS. 9 and 11 which, taken together, show a schematic, vertical section, taken along lines 9—9 and 11—11 of FIG. 3. These views show the cam follower pins 126a on lever 123a (see FIGS. 6 and 6a) mounted on block 84a and cam follower pins 141a on lever 137a mounted on block 85a and their respective cam grooves 128 and 143. Their counterpart control elements, namely, cam follower pins 126 and 141 and their cam grooves 127 and 142, are identical, but reversed, and it is believed that a description of one set of parts will suffice.

As the trailing block 84a is propelled by its chain 65 around its sprocket 69 on shaft 67 (see FIG. 9) the block 84a arrives at the short horizontal section 111c (see FIG. 8) in a rearwardly tilted position. In this position the cam follower pin 126a is disposed in the lower part of the U-shaped, cut-out section 120a, similar to the cam follower 126 in the cut-out section 120, as shown in FIG. 6, and this cam follower 126a also remains for a short distance of travel after the block 84a has been swung to vertical position, similar to the position of cam follower 126, indicated in broken lines in FIGS. 6 and 8. It is necessary for the cam groove 128 to extend around the end sprockets on shaft 67. As herein shown (see FIG. 9), approximately above the shaft 67, the cam follower 126a passes into a short horizontal section of the cam groove 128, indicated at 128b. Joined with section 128b is a short, upwardly inclined section 128c followed by a long section, indicated at 128d. When the cam follower 126a reaches and passes up along the inclined cam groove section 128c, the lever 123a swings upwardly to lift finger 89a. It is to be understood that, at the same time, the lever 123 is swung upwardly to lift finger 89, as shown in FIG. 6, to fold upwardly the trailing flange 22 on the bottom panel of the carton blank. The cam follower 126a then moves to and travels within the long section 128d of the cam groove to hold the finger in upraised position, thus holding flange 22 in vertical position as shown in FIGS. 6, 20 and 21. The downward withdrawal of the fingers 89 and 89a will be described presently.

Referring to the raising of the leading folding finger 90a on block 85a, this block after traveling along the arcuate path, through which it is propelled by chain 65, reaches the horizontal section of its path with its finger 87a inclined forwardly and maintained below the level of the carton blank, being in the same position as finger 87 as indicated in broken lines in FIG. 8.

The follower pin 141a, as it moves around the end of the conveyor, is guided in an arcuate section 143b of the cam groove 143. This section leads into a horizontal section 143c, extending downstream beyond the upwardly inclined section 128c of groove 128, until it joins with a short, upwardly inclined section 143d, comparable in length to that of section 128c. Beyond this inclined section 143d is a relatively long section 143e and while the cam follower is traveling in this section, the finger 90a continues to be held in raised position.

When the cam follower 141a passes up the inclined cam groove section 143d, it causes the lever 137a (the counterpart of lever 137 in FIG. 6) to swing upward thus lifting the folding finger 90a. At the same time, the finger 90 is lifted, so that both fingers engage and fold upwardly the leading flange 22 of the carton, as indicated in FIGS. 6, 20 and 21. The fingers 90 and 90a continue to be held in upraised position while the cam followers move within the long cam groove sections—that is, section 143e and its counterpart section in the cam groove 143. The withdrawal of fingers 90 and 90a from contact with the leading narrow carton flange 22 will be described presently.

OPERATION OF FOLDING FINGERS FOR SIDE WALL FLANGES

The movement of the folding fingers 82, 82a and 83, 83a will now be described. These fingers are propelled by the chains 66 and 66a attached to the finger supporting blocks 80, 80a and 81, 81a, as indicated in FIGS. 3 and 7. The blocks 80, 80a and 81, 81a are moved up around the chain sprockets and, after traveling along the upper run of the chains, the block fingers continue to remain in their inoperative positions below the path of the carton blank until they reach positions approximately above the conveyor shaft 64, see FIG. 12, at which positions the fingers are simultaneously swung up for preliminary engagement with the narrow flanges 23, 23 and 24, 24 at the ends of the carton side panels, as shown in FIG. 20, after which, as they travel, they are simultaneously swung further inward to positions, indicated in FIGS. 7 and 21, to force the flanges 23, 23 and 24, 24 into inclined positions over their attached side walls.

After the carton blank has advanced to a position in which the gusset portions 28, 28 and 29, 29 have been engaged by the gusset hold-down bars 92 and 92a, as shown in FIGS. 2A and 12, the folding fingers 82, 82a and 83, 83a are simultaneously swung away from flange contact and are moved to and retained in their inoperative positions below the path of the blank.

Trailing folding fingers

Referring to FIGS. 2A, 3, 3A, 7, 12, 12A and 13, the trailing block members 80, 80a have on their side faces laterally projecting follower pins 145 and 145a, respectively. These are located below and upstream from the block pivot rod 114 when the block fingers 82 and 82a are in their fully raised position, as shown in FIG. 7. These follower pins project inwardly toward each other. See FIGS. 3 and 3A.

The trailing block members 80, 80a have additional follower pins 146 and 146a, projecting laterally outward, away from each other, and are located at a level above the pivot rod 114 when the fingers are in upright position, follower pin 146 being shown in FIG. 7.

The follower pins 145 and 145a are received in cam grooves 147 and 148, respectively, formed in the cam bar sections 79 and 79a, respectively, see FIG. 3A which extend the full length of the gusset fold conveyor and around its ends.

The outwardly extending follower pins 146–146a are received in cam grooves 149 and 150, respectively, which are formed in short cam bar sections 151 and 151a located at opposite sides of the gusset fold conveyor. See FIG. 2A. Also see FIGS. 3, 3A and 12A.

Leading folding fingers

Referring to the leading block members 81, 81a, shown in FIGS. 2A, 3, 3B, 7, 12, 12A and 13, which carry the leading fingers 83, 83a, these block members have laterally projecting follower pins 152, 152a, respectively, located on rearwardly extended portions 153, 153a of such blocks 81, 81a. See FIG. 7. These follower pins are located upstream from and at a level above the pivot rod 113. They extend inwardly toward each other and are received in cam grooves 154 and 155 formed in the cam groove bars 78 and 78a.

The leading block members 81, 81a have additional follower pins 157, 157a projecting laterally outward, away from each other, and are located on downwardly extended portions 158, 158a of the blocks. As indicated in FIG. 7, when the block fingers 83, 83a are in fully raised position, the cam follower pins 157, 157a are directly below the pivot pin 113 of the blocks. The pins 157, 157a are received in cam grooves 159 and 160, respectively, formed in the short cam groove bar sections 151, 151a. See FIGS. 3B and 12A.

Control of trailing folding fingers

Referring to the control of the trailing folding fingers 82, 82a—as the cam follower pins 145, 145a move around the tail sprockets and into a horizontal path on the upper run of the conveyor, the initial level of the cam grooves 147 and 148 is sufficiently below the carton blank path to keep the folding fingers 82, 82a in inclined positions below such path. As both cam grooves 147 and 148 are identical, except reversed, a description of one of the grooves, namely groove 147, should suffice. See FIGS. 12 and 13.

At a location a short distance upstream from the shaft 64 the cam groove 147 has a short, upwardly inclined section 147b which swings the finger 82 clockwise to a more nearly upright, but rearwardly inclined position, as shown in FIG. 12. The finger 82 thus comes into preliminary engagement with the trailing flange 23 on side wall panel 18 of the blank which is then in an outwardly bulged position, as shown in FIG. 20. By a comparison of FIGS. 12 and 9, it may be observed from FIG. 9 that the folder fingers for the trailing flange on the bottom panel 17 have previously been moved upwardly to fold such flange (see finger 89a in FIG. 9), and the outer edges of the side walls have been slightly lifted by their movement along the plow bars 91 and 91a. See plow bar 91a in FIG. 12.

The cam follower 145 on the block 80 then advances along a short horizontal section 147c of cam groove 147. It then travels along short, upwardly inclined groove section 147d which swings the block 80 still further in a clockwise direction so that it assumes the broken line position directly above the shaft 64. This brings the finger of block 80 into the position, best shown in FIG. 7, to swing the side wall flanges inward at an angle of approximately 45° over their attached side walls.

The cam follower 145 then moves along a horizontal section 147e of the cam groove which maintains the finger 82 in the position shown in FIG. 7 until the cam follower enters a short, downwardly inclined groove section 147f which causes the block 80 to swing back counterclockwise. This action occurs after the gusset portions 28, 28 of the partially folded blank have moved in beneath the gusset holding bar 92, as shown at the right in FIG. 12.

The cam follower, after leaving groove section 147f, reaches horizontal groove section 147g which maintains the finger 82 at an angular position below the path of the blank for the remainder of its passage on the upper run of the conveyor. The block 80 continues to remain with its finger 82 in its inoperative position until it passes around on the lower run and again reaches the short inclined section 147b on the upper run of the conveyor.

In the area of the gusset holding bars 92, 92 it is desirable to assist the action of the trailing blocks 80, 80a in their retrograde movement. For this purpose the short cam groove bars 151, 151a are employed. See FIG. 12A. While the cam followers 145 and 145a are moving within their cam grooves 147 and 148 from the horizontal sections (section 147e and its counterpart in groove 148) and along the downwardly inclined, short sections (section 147f and its counterpart in groove 148), the upper cam followers 146 and 146a on blocks 80 and 80a enter the upper cam grooves 149 and 150 in the respective short cam bar members 151 and 151a. This is best shown in FIG. 12A as regards the block 80a and cam bar section 151a. The cam follower 146a travels in a short, horizontal groove section 150b and then along a short, downwardly inclined section 150c, and finally along a further horizontal section 150d. The junction between groove sections 150b and 150c corresponds to the junction between sections 147e and 147f; and the junction between sections 150c and 150d corresponds to the junction between sections 147f and 147g, as shown in FIG. 12. Thus, the control of the retrograde swinging movement of the trailing blocks 80 and 80a is reinforced in the area of the short cam bar sections 151 and 151a and the gusset holddown bars 92, 92.

Control of leading folding fingers

Referring to leading block members 81, 81a, these members, moving in advance of the block members 80, 80a, pass around the tail sprockets and into a horizontal path on the upper run of the conveyor with their blank contacting fingers swung downwardly and forwardly below the path of the blank while their cam followers are traveling in the initial horizontal sections of their cam grooves. Referring to FIG. 12, showing block 81 with its folding finger 83, the cam follower 152 first moves within a horizontal section 154a of the groove 154. At a location downstream from the end of plow bar 91a the section 154a joins with a short downwardly inclined section 154b which swings the block 81 counterclockwise to bring the finger 83 to a preliminary, upraised, but slightly inclined position to engage the outwardly bulged leading flange 23 as seen in FIG. 20. The cam follower 152 then moves along a short, horizontal section 154c, which maintains the finger 83 in fixed angular position, after which the cam follower moves along another short, downwardly inclined section 154d which causes the finger 83 to swing further in a counterclockwise direction, bringing it to the position shown in FIG. 7 to swing the leading flange 24 at approximately a 45° angle over its attached side wall. The cam follower 152 then moves along groove section 154e to maintain the finger 83 in the position shown in FIG. 7, after which the cam follower moves along a short, upwardly inclined groove section 154f to swing the block 81 clockwise and bring the finger 83 to a position below the path of the blank. The follower then moves into a long, horizontal section 154g which maintains the finger 83 in the inoperative position to which it was moved by section 154f. There is no further angular movement of block 81 until it again reaches the inclined groove section 154b.

With respect to the leading block members 81 and 81a an equivalent reinforcement of their retrograde swinging action is effected as the blocks pass along the respective short cam groove bar members 151 and 151a. The cam followers 157 and 157a enter and move along cam grooves 159 and 160, see FIGS. 3 and 12A, in advance of the movement of cam followers 146 and 146a into their cam grooves 149 and 150. The control of these leading block members 81, 81a by cam bar sections 151, 151a will be described principally with respect to block member 81a, as shown in FIG. 12A. The follower pin 157a first travels along a horizontal groove section 160b which leads into a short, upwardly inclined section 160c. This assists in the swinging of the block 81a clockwise. The section 160c is followed by an additional horizontal section 160d which extends to the end of the short cam groove bar 151a. The junction between the horizontal section 160b and 160c corresponds to the junction between groove 154e and 154f, as shown in FIG. 12; and the junction between groove sections 160c and 160d corresponds to the junction between groove sections 154f and 154g, also as shown in FIG. 12.

RELEASE OF BOTTLE POSITIONING FINGERS

The control means for releasing the bottle positioning fingers 86, 86a and 87, 87a will now be described. Referring to FIGS. 10 and 11, taken along lines 10—10 and 11—11 respectively of FIG. 3, the action is such that after the side wall of the carton blank have been folded to upright position by the folding plows 104 and 105, and the partially formed package is ready to be moved in between the side presser members, indicated as a whole at 7, the leading bottle engaging fingers 87 and 87a and the leading flange folder members 90 and 90a are swung forwardly and downwardly to inoperative position, while the trailing bottle engaging fingers 86 and 86a, and the trailing flange folder members 89 and 89a continue for a brief period to propel the partially formed package in between the side presser members until such members can take control of the package.

In addition to FIGS. 10 and 11, reference is also made to FIGS. 3, 3A, 3B, 6 and 6A. It is to be noted that FIG. 10 illustrates only the finger carrying blocks 84 and 85, their cam follower pins 112 and 110, respectively, and the respective cam grooves 109 and 111 for these pins. FIG. 11, on the other hand, illustrates only the companion finger carrying blocks 84a and 85a, omitting the cam grooves for their cam follower pins, but showing the lever control pins 126a and 141a for the respective levers 123a and 137a for the vertically slidable fingers, and also showing their cam grooves 128 and 143. It is to be understood that the counterpart elements for the grooves and follower pins, shown in FIGS. 10 and 11, are identical but reversed.

Release of leading fingers

At a location close to the upstream end of the side presser members the long, horizontal section 109e of the groove 109 (see FIG. 10) joins with a short, upwardly inclined section 109f, causing the block 85 to swing clockwise to bring its finger 87 below the level of the carton bottom wall panel. Shortly before this last mentioned action, the follower pins for the slidable folding fingers move from their long, horizontal sections to short, downwardly inclined sections. These are indicated with respect to block 85a, showing the long section 143e and the downwardly inclined section 143f. Movement of the follower pin into this section causes the upper end of the slidable finger 90 to be withdrawn downwardly from the path of the carton. In order to compensate for the rotary motion of the block 85a and keep the slidable finger in normal withdrawn position, the follower pin 141a then moves up a very short, upwardly inclined groove section 143g, after which the follower pin 141a moves within a long section 143h which keeps the finger 90a controlled by follower pin 141a, in normal withdrawn position for the remainder of its travel on the upper run of the conveyor, and also around the head sprocket and along the lower run until the follower pin 141a returns to the groove section 143b. See FIG. 9.

Release of trailing fingers

Withdrawal of the trailing bottle engaging fingers 86 and 86a is illustrated with respect to finger 86 in FIG. 10. As the follower pin 112 for block 84 travels within the long section 111e of the cam groove a short distance beyond the upstream ends of the side presser members, the cam follower pin moves within a short, downwardly inclined groove section 111f, causing the block 84 to swing counterclockwise to remove finger 86 from contact with its bottle and bring it below the path of travel of the carton bottom panel. The cam follower pin 112 then moves to a short horizontal groove section 111g which joins with the arcuate section of the groove which conforms with the head sprocket of the propelling chain. Just prior to the time when follower pin 112 reaches the junction between groove sections 111e and 111f, the trailing, vertically slidable folding fingers 89, 89a are withdrawn downwardly. This is shown with respect to the folding finger on block 84a in FIG. 11. The cam follower 126a on the lever 123a, carried by block 84a, moves from the horizontal groove section 128d to a short, downwardly inclined groove section 128e. This swings down the lever 123a and the follower pin 126a is received into the lower end of the cut-out section 120a where it remains until the follower pin travels back to the upper run of the conveyor and is again lifted by entering groove section 128c. The trailing bottle-engaging fingers and trailing folding fingers are thus removed from propelling position for the partly formed package immediately following the movement of the package in between the side presser members which then take over the propulsion of the package.

FOLDING AND SEALING OF TOP WALL PANELS

When the side walls 18 and 19 are raised by the folding wheels, they next arrive into engagement with lower folding plows 104, 104 and next with upper folding plows 105, 105. See FIG. 2A. The downstream end sections of these plows, indicated at 104a and 105a, are straight and act as guide bars to hold the side walls in vertical positions against the bottle rows. These end portions extend only for a short distance and hold the walls vertical until they arrive at a location where they can be engaged and held in vertical position by the side presser members, indicated as a whole at 7.

The next steps in the operation are to convey the partially formed package past adhesive applying means, whereby the top panel section may be joined, and to fold such panel sections into lapping relation. The folding operation preferably is begun while the package is being advanced by the trailing flange folders 89, 89a and is continued after such flanges folders have delivered the package in between the side presser members. As previously described, the flange folders 90, 90a are moved to inoperative position as they approach the side presser members and the trailing flange folders 89, 89a continue in propelling positions until the package is moved in between the presser members, at which time the trailing flange folders are moved to their inoperative positions. See FIG. 10. The side presser members are operative to hold the side walls snugly against the bottle group as well as to advance the package during the time adhesive is applied to one top panel section and while the overlying section is folded down and pressed against the underlying section, thus assuring accurate joining of the top wall sections. The side presser members continue, without interruption, to convey the package and and thus are in effect a part of the second conveying means.

Side presser and conveying members

Referring to FIGS. 2B, 3C, 4, 5 and 13 the construction of the side presser members will be next described. These members each comprise a pair of upper and lower endless chains 163 and 164 passing around tail sprockets 165, 165 and head sprockets 166, 166. The tail sprockets are mounted on shafts 167, 167 and the head sprockets are mounted on shafts 168, 168. The lower ends of shafts 168, 168 are journalled in gear boxes, one of which is shown at 162 in FIG. 1A, containing gearing suitably driven by sprocket chain 162a from line shaft 73. The driving mechanism is arranged to drive the chains 163 and 164 at the same rate as the speed of travel of the sprocket chains 65, 66 and 66a, so that there will be a smooth transition from the propulsion of the package by the trailing folding fingers 89, 89a and propulsion by the chains 163, 163 and 164, 164.

The shafts 167 and 167 are journalled at their lower ends in journal members secured on base plate sections 60, 60. See FIGS. 2B and 3C. A journal for one of the tail shafts 167 is indicated at 169. See FIG. 3C.

As shown in FIG. 4, the chains carry spaced upper and lower supporting elements 163a, 164a on which are secured vertically extending, wall-engaging, pressure strips 170, 170 having frictional facing surfaces to engage the carton side walls without slippage. In order to hold the chains 163 and 164 so that the wall-engaging pressure strips 170 will bear firmly against the carton side walls, the chains are guided between the upper and lower chain guide bars 170a and 170b secured at each side upon elongated, upstanding bracket members 170c, 170c.

Folding and sealing of top wall sections

When the package has reached the lower and upper plow bars 104 and 105, (see FIG. 2A) the top wall section 20a and inclined wall 20, and also the other top wall section 21a and inclined wall 21, are both disposed in a single plane and are inclined inwardly over the bottles. At this location it is preferred to begin swinging top section 20a outwardly to keep it clear to the adhesive applicator and at the same time bring the hinge line between the other top wall section, 21a, against the edge of a folder plate preparatory to folding the inner top wall section down upon such plate. For this purpose there is provided a relatively long folder bar 171 (see FIGS. 2A, 2B, 3C, 4 and 13) supported at its downstream end on a depending bracket 172 (see FIGS. 3C and 4) having an upwardly extending part 172a attached to a transverse frame member 3c in the form of an inverted channel beam. As shown in FIGS. 2A and 2B, the upstream end of the folder bar 171 is located above the line between the two rows of bottles and is directed outwardly at an angle so that its opposite or downstream end is aligned above the row of bottles which are in contact with side wall 18. See FIG. 4. The major portion of bar 171 is also inclined upwardly, as shown in FIGS. 3C and 13, with a horizontal portion adjacent its downstream end where it is secured to the bracket 172.

As shown in FIGS. 2B and 4, a combined bracket and guide bar 173 has a part 173a which extends along the folder bar 171 to engage the outer surface of the top wall section 20a adjacent its hinge connection with inclined wall 20 to assure the folding of top wall section 20a at its hinge line. This combined bracket and guide bar 173 is secured by bolts, one of which is shown at 173b in FIG. 4, to a transverse channel beam frame portion 3c.

While top wall section 20a is being controlled between the folder bar 171 and the part 173a, the underlying top wall section 21a and inclined wall 21 are controlled by a horizontal plate and bar member, indicated as a whole at 174. See FIGS. 2A, 2B, 3C, 4 and 13. This member 174 is generally horizontal and is supported at a medium location on a depending bracket 175 (see FIG. 3C) secured to the transverse frame portion 3c. As viewed from the side, the upstream end of the member 174 is located near the end of the folder bar 171. For a part of its length the member 174 has the form of a thin blade, indicated at 174a. See FIGS. 3C and 13. Portion 174a joins with a thicker and stronger portion 174b, and this in turn joins with a still heavier and more rigid bar portion 174c, attached, as stated above, to the depending bracket 175 about midway of its length.

As viewed from above (see FIGS. 2A and 2B) the portion 174a of member 174 has a tapered end located approximately above the line between the bottle rows to assure engagement with the inner surfaces of the top wall section 21a and inclined wall section 21 approximately at the hinge line between these two wall sections. At a point which, in the present instance, is approximately in line with the shafts 167 of the side presser members the member 174 has an outwardly angled edge portion, indicated at 174d (see FIG. 2B) which joins with a straight edge portion 174e extending beyond the adhesive applicator roll, to be presently described. The portion 174e is relatively thin and projects laterally from the thicker and more rigid main supporting portion 174c. See FIG. 4.

It is to be noted from FIG. 4 that the outer edge of portion 174e forces the top section hinge line 48 outward so that the inclined wall is displaced outward from its final position in the package and so that the upper surface of portion 174e is spaced above the bottle tops and thus above its final position in the package.

Means are provided for guiding the top wall section 21a to slide flatwise upon the surface of portions 174d and 174e. See FIGS. 2B, 3C and 13. For this purpose a holddown plate is employed, indicated as a whole at 176. See FIG. 4. This plate has an upwarly inclined, upstream end 176a. As shown in FIGS. 2B and 4, the plate 176 has a vertical flange 176b by means of which it is secured with screws to the bracket 172 which supports folder bar 171. The upwardly inclined, upstream end of the plate 176, indicated at 176a, has an angular lateral edge 176c extending to a narrow, tapered end, the apex of which is disposed outwardly of the longitudinal center line of the package and outside the straight guide section 105a of the folding plow 105 (see FIG. 2B) so that the upper edge of the inclined wall section, before it leaves guide section 105a, will reach the plate 176. The inclined section 176a of the plate will then engage outside the top wall section 21a and as such section advances it will be forced inwardly and downwardly by the angular edge 176c until the top wall section is brought to a flatwise position beneath the horizontal portion of the plate 176 and flatwise upon the portion 174e of the bar member 174, as best shown in FIG. 4. The top wall section will then be in position to receive lines of adhesive, the application of which will presently be described.

As shown in FIGS. 2B and 4, a thin guide plate element 177 is supported on the horizontal bracket member 173. The plate 177 is formed with an opening through which the outer, supported end of the bracket 173 projects. This plate 177 is outwardly flared at its upstream end, as shown at 177a, in order to guide the upwardly projecting top wall section 20a and its attached inclined wall 20 to an inward position to bring the hinge area of the walls into the desired relation to the guide bar portion 173a. The lower edge of the plate 177 is arranged to contact the inclined wall 20 and serves to guide the wall to the desired inclined position, and subsequently hold the wall in such position as the bottle and carton assembly advances. Part of the lower edge portion of the plate 177 is preferably bent to extend inwardly, as indicated at 177c, to provide an additional edge to guide and hold the inclined wall section 20. The portion of plate 177 extending downstream may be suitably secured to the guide bar portion 173a, as by means of welding or by machine screws. The downstream end of plate 177 terminates near a bracket member 178 supported on a depending stud 178a secured at its upper end on a transverse frame member 3e.

As the underlying top wall section 21a emerges from beneath the downstream end of the hold-down bar 176 and is still supported on the upper face of the portion 174e of the horizontal bar 174, the top wall section passes under an adhesive applicator roll 179. See FIGS. 1, 2B, 3C and 4. This roll is mounted on a driven shaft 179a suitably journalled in supporting elements within the housing indicated at 1b in FIG. 1. A motor and other suitable devices are also supported within this housing for delivering adhesive. The roll 179 has spaced, disk-like applicator portions 180 and 181, arranged to apply two relatively narrow lines of quick-setting adhesive to the top wall section 21a. One line of adhesive is applied near the free edge and the other line is applied near the mid-portion of the section, as best indicated in FIG. 4. These lines of adhesive are also indicated in broken lines in FIG. 14. One line, indicated at 182, which is applied along the free edge of the top wall section, is located in the finished package along the inside edge of the weakened line 49 and the other line, indicated at 183, is located along the edge of the weakened line 50. The adhesive lines are applied along the full length of the underlying top wall section 21a and adhesive line 183 also extends along the weakened line in the end flaps 41 and 42 on such top wall section. Thus the flaps 40 and 41 at one end of the package and also the flaps 39 and 42 at the other end of the package will be sealed together, forming, in effect, single, downwardly swingable flaps on the composite top wall formed by the joined sections 20a and 21a.

The adhesive employed for sealing the top wall sections is preferably of the hot melt type. Applicators for applying this form of adhesive are conventional and comprise a storage reel having a rope of solid, but flexible adhesive wound thereon which is fed automatically into a melting chamber and transferred to a disk-like applicator wheel designed to apply a line of hot melt adhesive of the desired width. A hot-melt applicator of this type is disclosed in the patent to F. A. Chidsey, Jr., No. 3,196,588. In the present instance, the hot melt adhesive is fed to the two disk-like sections of the applicator roll 179 to apply two spaced narrow adhesive lines in hot condition. The advantage in this type of adhesive application is that the adhesive sets after a very short interval. The applicator roll may be rotated continuously, but the arrangement is such that the adhesive is fed from the roll only when the disk portions of the roll are in contact with the paperboard forming the top wall sections. In the intervals between the passage of packages past the adhesive roll no adhesive will be released from the disk portions of the roll. Suitable automatic control devices are employed to interrupt the feed of the solid rope adhesive from its reel if hot adhesive is not being applied by the applicator roll 179.

Means are provided for shifting the underlying top wall section into its final position within a short interval following application of the two lines of adhesive; and additional means are provided for immediately folding the overlying top wall section 20a down upon the underlying section 21a and applying pressure upon the adhesive joint to assure an effective and accurate seal.

For the purpose of shifting the underlying top wall section, there is provided a guide member, indicated as a whole at 185 (see FIGS. 2B, 5 and 24) comprising a thin metal plate having a laterally extending portion 185a suitably supported on a depending frame piece 186 attached to the transverse frame member 3e. Extending upward from the inner edge of the portion 185a is a vertical portion 185b. This vertical portion may also be attached to depending supports (not shown) on the machine frame. Extending downward from the outer edge of the lateral portion 185a is a narrow portion 185c and extending inward from the lower edge of portion 185c is a lateral portion 185d, having an angular, inwardly directed, upstream edge section 185e and a straight, downstream edge section 185f. See FIG. 2B. The angular edge section 185e, as the package advances, forces the inclined wall 21 inwardly from its position, shown in FIG. 4, to its final position, shown in FIG. 5, where it is held by the straight edge section 185f.

As soon as the underlying wall section 21a and its attached flaps have had adhesive lines applied thereto, the advance of the package carries the wall section beyond the end of the straight edge guide portion 174e at which point it is free to move downward onto the lower level, horizontal portion 174f. See FIGS. 2B, 3C and 5. This will allow the underlying top wall section 21a to move down to rest on the bottle tops at the same time that the inclined wall 21 is swung inwardly. In order to control the downward movement of the underlying top wall section, the upstream end of the laterally extending portion 185a is bent upwardly, as indicated at 185g. See FIG. 2B.

Following the movement of the underlying top wall section onto the lower horizontal part 174f of bar member 174, means are provided for folding the overlying top wall section 20a onto the underlying section. For this purpose there is provided a plow and holding member, indicated as a whole at 187. See FIGS. 2B, 3C, 5 and 24. This member is secured to the underface of an offset projection on bracket 178. See FIG. 5. The upstream end of the member 187 is bent upwardly to provide a plow portion 187a below which the top wall section is engaged. The portion 187a has a curved or angular edge portion 187b along which the top wall section engages as it is swung down. As the package advances, the wall section 20a moves beneath the horizontal portion 187c where it is held in close relation to the underlying wall section 21a.

Pressure means is provided to press the wall section 20a firmly against section 21a as soon as these wall sections emerge from between the undersurface of portion 187c and the top surface of the portion 174f. For this purpose a driven pressure roll 188 (see FIGS. 1, 2B, 3C and 5) is carried on a shaft 189, mounted in suitable bearing on supporting elements within the housing indicated at 1c in FIG. 1. A backing roll 190 is carried on an axle supported in bearings in a pair of projecting brackets 191, 191, secured on the end of the bar member 174. This roll 190 is located between the bottle necks, as best shown in FIG. 5, and supports the lapping top wall sections 20a and 21a as they advance below the pressure roll 188, thereby causing these sections to be pressed firmly together as the hot-melt adhesive between the sections is in the process of becoming set.

After the package passes the pressure rolls 188 and 190 it continues for a brief interval to be propelled by the side pressure members, as indicated in FIG. 2B. At this location the bottom wall end flanges 22, 22 are in vertical position and the side wall end flanges 23, 23 and 24, 24 are in tucked-in positions between the end bottles and the side walls, as shown in FIG. 17A. The flaps 40 and 41, at one end of the package, and the flaps 39 and 42 at the other end, are secured together and extend straight out in the plane of the composite top wall, as shown in FIG. 17B. The small panels 25, 25 and 26, 26, connected by gussets to the ends of the side wall flanges 23 and 24, are disposed in an approximate vertical position so that the connected porjecting flaps on the top wall sections, when folded down, can be secured to these vertical panels 25 and 26.

PACKAGE TURNING MECHANISM

By placing FIGS. 2B and 2C in alignment, it may be seen that the partially completed package is delivered from the discharge end of the side presser members to the package turning members indicated as a whole at 10 in FIGS. 1, 2C and 3D.

The lug chain conveyor, previously referred to and indicated as a whole at 9, is arranged to convey the packages from the side presser members 7 to the turning mechanism, indicated as a whole at 10. After the package has been turned through a 90° angle, the conveyor 9 continues to convey the packages past additional treating mechanism to the place where the packages are discharged from the machine.

The lug chain conveyor comprises a pair of spaced chains 192, 192 running over spaced sprockets supported on a tail shaft 193, see FIG. 1, located at the upstream part of the frame for the package turner. These chains pass around head sprockets 194, 194 (see FIGS. 2D and 3E) fixed on head shaft 195 which has fixed thereon a centrally located sprocket 196 over which passes a driving chain 197, schematically indicated in FIG. 3E. The chain 197 passes around a lower sprocket 196a which is driven through suitable gearing from the line shaft 73.

The upper runs of the chains 192 are guided between upper and lower sections of slotted plates 198, 198, welded or otherwise attached to channel elements 199, 199 secured on longitudinal angle-bar frame members 1d, 1d, which in turn are carried by suitable transverse frame members, not shown. The lower runs of chains 192 are supported on longitudinal bars 200, 200 secured by suitable bracket elements to lower, longitudinal angle bar frame members 1e, 1e carried by transverse frame members, one of which is indicated at 3 in FIG. 3D.

The upper portion of the supporting frame for the turning mechanism (see FIG. 3D) comprises outer, longitudinal, angle-bar sections 1f, 1f on which are supported transverse frame sections 3f, 3f. Extending upwardly from sections 3f are vertical frame sections 2a and 2b. Extending from section 2a at the top of the frame structure is a transverse frame section 3g. On the opposite side of the frame, and extending inwardly from vertical section 2b, is a transverse frame section 3h.

As the packages travel between the side presser members, indicated as a whole at 7, they are slidably supported from below on the plates 60, 60 shown in FIGS. 2, 2A, 2B, and 2C. These plates are spaced so that they support the edge portions of the package bottom wall. From plates 60, 60 the packages slide onto similar plates 60c, 60c at the same level and spaced the same distance apart. These plates 60c, 60c are supported on the angle iron frame members 1d, 1d and extend to a point near the discharge end of the machine.

An intermediate, narrow supporting plate 60d is located in spaced relation between plates 60c, 60c (see FIGS. 2C and 3D). This plate is supported on frame section 1g carried on a suitable transverse frame member (not shown), and extends, in the present instance, only a short distance beyond the package turning mechanism.

The lugs on conveyor chains 192 are indicated at 201, 201 and are relatively long so that their ends are adapted to swing in a wide arc at the receiving end of the conveyor and come up behind packages as they are released by the side presser conveyor members. The lugs travel in the spaces between center plate 60d and side plates 60c, 60c with their upper end portions projecting substantially above the level of such plates. The spacing of the successive lugs 201, 201 along the conveyor chains and the speed of such chains are fixed to conform to the speed and spacing of the combined folding and conveying fingers 89, 89a, so that a package released by these folding fingers and passing between and discharged from the side presser members, will emerge from between such members just prior to the passage of a pair of lugs 201, 201 around its sprocket, whereby the successive sets of lugs will move up against the trailing ends of successive released packages and advance such packages into the package turning device.

In the turning of a package there is employed an arrangement of guide bars, particularly shaped to guide the opposite ends of the package. A trailing corner of one side of the package is first engaged by a lug on a traveling member movable in a horizontal plane. This member is operated at a speed in excess of that of the conveyor lugs 201, so that its lug will come up behind the package and move the engaged corner ahead of the conveyor lugs. The package is then engaged near its leading corner on the same side of the package by depending push rod crossing the path of travel of the package to cause the opposite leading corner to engage within a V-shaped portion of the guide bars while the laterally displaced, outwardly swung corner, at the trailing end of the package, continues to be swung forwardly and outwardly, where, after approximately an 80° turn, the lug slips out of contact with such corner. The push rod, which engaged the package near its leading corner, then moves past the leading corner beyond the normal package path. This combination of movements leaves the package momentarily at rest, a short distance ahead of the advancing push lugs 201 and with its long axis at a slight angle to the push lug path. The package is also somewhat laterally displaced with respect to such path. The push lugs 201 then arrive in behind the package to move it forwardly while the end of the package that was previously trailing engages an angular section of the guide bars which shifts the package to a central position with respect to the path of the conveyor lugs 201. At the same time, both lugs become engaged behind the package, thus bringing its long axis at right angles to the conveyor path.

Referring particularly to FIGS. 2C and 3D, two sets of guide bar members are employed, indicated as a whole at 202, 202 and 203, 203. These guide bars are spaced one above the other and are secured on upstanding brackets 204a, 204b and 204c, for the bars 202, 202, and brackets 205a, 205b, 205c and 205d, for the bars 203, 203, bolted onto the flat, package-supporting plates 60c, 60c.

Referring to FIG. 2C, the receiving ends of both sets of guide bars are outwardly flared and lead to straight sections 202a and 203a. Leading from straight section 202a, is an outwardly angled section 202b which extends past the turning mechanism and joins with an inwardly angled section 202c that, in turn, joins with a straight section 202d which extends to the pressure applying device 13 for sealing the downturned end flaps on the composite top wall. See FIG. 2D.

Leading from straight section 203a, at the other side of the package path, is an outwardly curved section 203b terminating at the end of another section 203c which is inwardly curved. This latter section joins with a straight section 203d which extends, like section 202d, to the pressure applying device 13. It is to be noted that the straight sections 202d and 203d are spaced farther apart than straight sections 202a and 203a, thereby to guide the ends of the packages instead of the sides.

The device with depending push rods for lateral engagement against the advancing package will now be described. See FIGS. 2C and 3D. Two similar sprocket chains 206, 206 are arranged, one above the other, to travel in horizontal planes and pass around sprocket wheels 207 and 208, secured respectively to vertical shafts 209 and 210. The rotation of the sprockets is clockwise as viewed in FIG. 2C. The shaft 210 is short and is journalled at its upper end in a bearing 211 supported on frame section 3h. The driven shaft 209 is longer than shaft 210 and extends downward through a bearing 209a on the transverse frame plate 3j. This shaft 209 has fixed at or near its lower end a gear wheel 212, which is driven by a meshing gear wheel 213 fixed on the upper end of a vertical shaft 214, the lower end of which projects into a gear box 215, containing reduction gearing to rotate the shaft 214. Extending from the gear box 215 is a short shaft 216 having thereon a sprocket wheel 217, driven by a sprocket chain 218 passing around a sprocket wheel 219 fixed on line shaft 73.

The sprocket chains 206, 206 carry a plurality of spaced pins 220, 220 projecting below the lower chain and having assembled thereon turnably mounted, tubular push rod elements 221, 221, projecting downwardly sufficiently to engage the upper portions of the package side walls, but terminating above the level of the guide bars 202 and 203. It is to be noted from FIG. 2C that the axis of the push rod chains 206, 206 through their shafts 209 and 210 extends angularly across the path of the packages with shaft 210 located farther upstream than shaft 209.

Means are provided for maintaining the push rod chains firmly in straight paths in the area where the chains pass over the package path. For this purpose, a set of two pairs of rigid, chain-guide bars 222, 222a on the side of upstream run of the chains, and another set of two pairs of chain-guide bars 223, 223a on the downstream side are provided. These chain-guide bars are supported on frame pieces 224, 224 attached to the transverse frame members 3g and 3h. The functions of the push rods 221 will presently be explained. At a position below the push rod chains, on the right hand side of the package path, as viewed when looking upstream of the machine, (see FIG. 2C) is a lug chain device, comprising a sprocket chain 225 passing around sprockets 226 and 227, secured respectively on vertical shafts 228 and 229. The shaft 229 is a short shaft and is journalled in bearings (not shown) located on the horizontal frame section 3f. The shaft 228 is longer and is journalled in a bearing 230, located on the underside of the section 3f. The lower end of shaft 228 has a sprocket wheel 231 secured thereon around which passes a sprocket chain 232 which passes around a sprocket wheel 233 secured on a short vertical shaft 234 journalled in a bearing 235 which is secured in a transverse frame plate 3j. The shaft 234 extends below this plate and has secured thereon a gear wheel 236 meshing with the gear wheel 212 (see FIG. 2C) on driven shaft 209.

In the present instance, the sprocket chain 225 has two laterally extending lugs 237, 237 arranged to engage a trailing corner portion of the package. The speed at which chain 225 is driven brings one of the lugs 237 into engagement with successive packages advanced by the upstanding lugs 201, 201 on chains 192. It is to be noted that the longitudinal axis of the lug chains is at an angle extending outwardly of the downstream direction of the conveyor chains 192.

The downwardly extending push rods 221, carried by chains 206, are timed with both the travel of the upstanding conveyor lugs 201 and the travel of the lugs 237 on chain 225 so that a lug 237, moving at a faster speed than the upstanding lugs 201, 201, engages the trailing corner portion of the package adjacent such lug 237 and swings the package clockwise, as viewed from above. This engaged corner slides forwardly, guided by the outwardly flaring guide bars 202b. Momentarily after the laterally extending lug 237 engages the package corner portion, a depending push rod 221 passes laterally at a small angle across the package path and engages the package on the same side as lug 237 near its foremost corner and urges the opposite side leading corner against the curved guide bar section 203b. This causes the opposite leading corner of the package to enter the V-shaped pocket formed by the arc-shaped bar sections 203b and 203c. This combination of movements, caused by the laterally extending lug 237 and oppositely moving depending push rods 221, 221, brings the end of the package adjacent the guide bar section 202b approximately flat against such section, and the movement occurs with sufficient rapidity to advance the package ahead of the upstanding push lugs 201, 201 while it is being rotated. As the package finishes its rotation, the laterally extending lug 237 slips past the corner of the package, and push rod 220 also leaves the package. The lugs 237 and push rods 221 are operated intermittently in timed relationship with the advance of the successive packages on the pusher conveyor under the control of lugs 201.

As the push rod leaves the package, the latter will be approximately in the broken line position shown, with its end wall flat against the guide bar section 202b. The package is left momentarily at rest until the upstanding conveyor lugs 201, 201 catch up with it and again begin to propel it forwardly. The end of the package then moves along the guide bar sections 202b, and then along section 202c which, being angled inwardly, causes the package to slide laterally. This brings the package into symmetrical, centered relation in front of the conveyor lugs 201 and with its right hand, advancing end against the straight guide bar section 203d, as indicated in broken lines in FIG. 2C. The package is then advanced to the devices for tucking in the triangular end tabs on bottom wall end flanges 22, 22.

POSITIONING OF TRIANGULAR END TABS

The triangular shaped tabs 59, 59 on the end flanges 22, 22 of the bottom wall remain in the planes of their attached flanges while the partially completed package has been acted upon as above described. Means are provided for folding these tabs inwardly and causing the pointed portions of the tabs to snap into position beneath the downwardly presented abutment surfaces formed near the lower edges of the main panel portions 55 of the partition 54. See FIG. 14. For this purpose there are provided at each side of the package path the rotary tab-depressing devices, respectively indicated as a whole at 11 and 11a. As these devices are identical except that their tab-engaging fingers are arranged to rotate in opposite directions, a detailed description of one of the devices is considered sufficient. The two devices are shown in plan in FIG. 2C and one of the devices, 11a, is shown in FIG. 3F, taken along section line 3F—3F of FIG. 2C.

The devices 11 and 11a are held within openings in a pair of inwardly extending supporting plates 238, 238, secured on the longitudinal side frame member 1, 1. Referring to FIG. 3F, a tab-engaging finger 239 is tiltably mounted on a pin 240 extending across a groove formed in the upper portion of a rotary support 241, the finger being guidably held to tilt within the groove. A ring 242 is secured on the support 241, and a semi-circular cam member 243 is supported by plate 238 so it is concentric with ring 242.

Referring to FIG. 3G, the rotary supports 241, 241 are secured on the upper ends of vertical shafts 245 and 245a, suitably supported in bearing on the machine frame. Each shaft has a bevel gear fixed at its lower end, indicated at 246 and 246a, meshing respectively with bevel gears 246b and 246c on shaft 246d. This shaft has a bevel gear 246e fixed at one end, meshing with a bevel gear 246f on a short shaft 246g. A sprocket 246h on this shaft is driven by sprocket chain 246i which passes over the sprocket 246j on the line shaft 73. By this mechanism the tab tucking fingers are rotated in opposite directions and in synchronism with the movement of the packages to enable the fingers to engage the triangular tabs on each package passing by such fingers.

The rear end of the tiltable finger 239 has a downwardly extending part 239a. This part carries a cam follower roller 247 which, in traveling over the high portion of the semicircular cam 243, will tilt the finger. At its tab-engaging end the finger 239 is rounded and has a lower flat surface 239b. When the end of the finger is rotated in and then swung down, it causes the tab 59 to swing inwardly and downwardly. The end portion of the tab bears upon the vertical edge of the central partition panel 55 and is first deflected somewhat upwardly and then snaps past the partition edge where the end of the tab will project inwardly beneath the downwardly facing abutment edge 58 of the panel 55. The resiliency of the paperboard at the hinge line of the tab keeps the tab pressed upwardly against the abutment surface on the partition. A coil spring 248 is received in recesses formed in the finger 239 and the ring 242. This spring becomes compressed, as the end of the finger swings downwardly, and forces the end of the finger to its normal raised position as the cam follower 247 moves onto the low portion of the cam 243. The finger 239 has a notch 249 formed in its lower edge to keep the under edge of the finger from contacting the hinge line between the tab 59 and its supporting flange 22. In order to control the upward swing of the tab-engaging end of finger 239 a suitable set-screw 250 is employed, passing through a threaded aperture in the finger in position so that the lower end of the set-screw will contact the upper face of the ring 242. After the finger has depressed the tab 59 and moves back upwardly, the end of the tab is held beneath the abutment edge 58 and remains in position to shield the lower end portions of the bottles from the entry of light.

SEALING TOP WALL END FLAPS

The lug chain 9 next propels the transversely positioned packages past adhesive applying devices, indicated as a whole at 12, see FIGS. 2C and 3E, to apply adhesive to the undersurfaces of the composite top wall end flaps. These flaps are formed, as previously explained, by sealing together the adjacent edge portions of flaps 40 and 41 at one end of the package and flaps 39 and 42 at the other end. After the top wall sections, and flaps just referred to, are first folded down and sealed, the composite top wall end flaps project outwardly in the plane of the composite top wall. See, for example, FIG. 17B.

As the composite top wall end flaps advance, they pass beneath hold-down plates, indicated at 251, 251 (see FIGS. 2C and 3E) the upstream ends of which are bent upwardly to assure that the flaps will be guided below such plates. Adhesive applying rolls 252, 252 are arranged below the plates so that their peripheries will be close to the low portions of the plates (see FIG. 3E) to engage the end flaps snugly as they pass over the rolls. The rolls are fixed on short shafts, one of which is indicated at 253, mounted in bearings in vertical plates 254 which are supported by upstanding bracket plates 255, secured to the side frame members 1, 1. Also fixed on each short shaft 253 is a sprocket 256 over each of which passes a separate sprocket chain 257, passing in turn around sprockets 258 on a driven shaft 259. The shaft 259 is continuously driven while the machine is in operation by suitable sprocket, sprocket chain and gearing connecting shaft 259 with the line shaft 73.

The adhesive supplied to adhesive applying roll 252 is preferably of a quick setting type, such as hot melt adhesive, and, in the present instance, is indicated as delivered in solid, flexible rope form from supply reels 262, 262 one of which its indicated in FIG. 1. The adhesive applying rolls are indicated as having outstanding, annular ribs or disk-like portions for applying three lines of hot-melt adhesive to the underside of the outwardly projecting, composite end flaps. The particular mechanism for heating the adhesive and delivering it to the applying rolls forms no part of the present invention, it being considered sufficient to state that the hot fluid adhesive is delivered to the disk-like portions by conventional means, similar to that disclosed in Pat. No. 3,196,588, above referred to, and will be transferred from such portions only when package flaps are passing over the rolls. During the intervals between such passage of flaps, no adhesive is delivered from the rolls.

After adhesive has been applied to the underside of the top wall flaps the lug chain 9 continues to propel the packages to carry them past flap fold-down means. Referring to FIGS. 2D and 3E, the upper one of the two sets of guide bars 202 and 203 terminate just before the top wall end flaps are ready to be folded down. The straight sections, 202d and 203d, of the lower guide bars extend to the receiving end of the flap engaging and pressure applying members, indicated as a whole at 13.

Immediately beyond the adhesive rolls 252 at each side of the lug chain conveyor 9 are located flap fold-down plow members 264, 264 attached to brackets 265, 265, secured on the package supporting plates 60c, 60c. The upstream end portions of the plows are flared outwardly, as indicated at 264a, and the lower edges of the plows each have a downwardly inclined edge 264b terminating at the receiving end of the presure members 13.

The members 13 for holding the downwardly folded top wall flaps until the adhesive sets have a construction similar to the side wall presser member 7. These members 13 each comprises a pair of spaced upper and lower endless chains 266 and 267 passing around tail sprockets 268, 268 and head sprockets 269, 269. The tail sprockets are mounted on vertical shafts 270, 270 and the head sprockets are mounted on vertical shafts 271, 271. The shafts 270 and 271 are journalled respectively in bearing indicated at 272 and 273, supported respectively on transverse members 274 and 275 attached to the longitudinal frame member. The shafts 271, 271 are driven from shaft 195 through suitable gears, sprocket chains and sprockets, as indicated in FIGS. 1 and 2D. This driving mechanism causes the chains 266 and 267 to advance at the same speed as that of the lug chain conveyor 9.

In the present instance, every other link of chains 266 and 267 is formed with a supporting bracket carrying short, laterally extending lugs 276 (see FIGS. 2D and 3E) on which are secured vertically extending bars 277, 277 having resilient facing elements 278, 278 secured thereto for engagement against the down-folded end flaps on the top wall sections of the package.

In order to keep the length of the chains traveling in a straight line between the head and tail sprockets, backing bars, one of which is indicated at 279 in FIG. 2D, are employed to bear against the rear surfaces of the chains. These backing bars are carried by brackets 280, 280 attached to frame member 1.

By the time the package has traveled to the discharge end of the presser members the adhesive on the downfolded end flaps has set and the package is complete. The upstanding lugs 201 on conveyor 9 propel the package off the spaced plates 60c and onto the gravity conveyor section indicated as a whole at 14. This section comprises two sets of idler rollers 281, 281 mounted on pins or axles supported between side bars 282, 282 which are secured to the machine frame at a downwardly inclined angle. The lugs 201 pass between the two sets of idler rolls, propelling the package onto the rolls and then the lugs pass from contact with the packages as they move with their chains down and around the sprocket wheels 194, 194.

Guide bars 283, 283, supported on upstanding members 284, 284, are used to guide the packages as they travel along the idler rolls. The packages may then be conveyed away, as desired, by conveying means placed at the end of the gravity roll section.

While the invention has, for convenience, been described with particular reference to bottles and bottle groups, it is to be understood that various aspects of the invention are also applicable to the packaging of other forms of containers or articles. It is accordingly desired that the references to bottles and bottle groups and references to packages, as well, be considered as employed in a broad or generic sense and not limited to the packaging of bottles, or the treating or handling of packages, unless required by the context. It is further pointed out that, while the mechanism of the present invention has been described as treating or handling packages, blanks or carton parts in various manners relative to the vertical or horizontal, this has been done only for convenience of description and definition, and it is therefore desired that references to the movement, location and positioning of various elements be considered in a relative and not a limited sense.

While the present description sets forth a preferred embodiment of the invention, numerous changes may be made in the mechanism as disclosed without departing from the spirit of the invention, and it is accordingly desired that the present embodiment be considered in all respects as illustrative and not restrictive, reference being had to the appended claims rather than to the foregoing description to indicate the scope of the invention.

We claim:

1. Mechanism for folding and sealing a prescored blank of foldable paperboard about a group of two rows of tapered top bottles positioned on a central or bottom wall panel of the blank to form a tubular carton having open ends, the blank being of the type having extending successively from opposite sides of the bottom wall panel hingedly connected side wall panels, hingedly connected upper wall panels adapted to assume an inclined position (herein referred to by the term "inclined walls"), and hingedly connected top wall sections, the free edge portions of which are adapted to be secured in lapping relation to form a composite top wall, the bottom and side walls having extending from their opposite edges relatively narrow, integrally hinged, flange sections, the narrow flange sections on the bottom and side walls being defined from their attached walls by score lines and having gusset fold sections connecting their ends, such sections being formed by inwardly converging score lines crossing such narrow flanges and meeting at the ends of the respective score lines separating the bottom and side walls, said mechanism comprising the combination of (a) conveyor means for propelling the flat blank, with a bottle group thereon, in a direction aligned with the tubular axis of the package to be formed;

(b) leading and trailing folding means operatively supported to travel with the conveyed blank to swing the narrow flanges thereon to upwardly raised positions and hold them for a limited time in such positions with the bottom wall flange sections disposed adjacent the end bottles of the rows;

(c) folding means at each side of the blank conveyor for slightly folding upward the respective side walls about their hinge connections with the bottom wall as the assembly advances;

(d) flange folding means for the side wall end flange sections, such means including members arranged to travel in synchronism with the conveyed blank and having leading and trailing flange-engaging elements, and means for moving such elements between inoperative and operative, flange-engaging positions as said elements advance, said flange-engaging elements being timed to move to operative positions to engage and swing the side wall flange sections inwardly approximately concurrently with the slight upward folding of the side walls, such inward swinging of the flange sections serving to bring them to an inclined position over their attached side walls;

(e) additional side wall folding means, one located at each side of the conveyor means, for folding to upraised position the respective side walls as the assembly advances, thereby confining the respective flange sections at the ends of each side wall between each such wall and the adjacent end bottle;

(f) supporting means, comprising an elongated guide-bar, extending longitudinally above the conveyor means, for supporting the underlying top wall section when downfolded, plow means for folding the inclined wall, which carries the underlying top wall section, inwardly toward the bottle group, and plow means for folding the underlying top wall section down upon such guide bar;

(g) plow means located downstream from the side wall folding means for engaging and folding inwardly the opposite inclined wall to final position against the bottle top portions.

(h) adhesive applying means, located downstream from the plow means which folds the underlying top wall section down upon its guide-bar supporting means, for applying adhesive to the exposed surface of such underlying section;

(i) additional plow means for folding the outer top wall section down upon the underlying top wall section as the partly formed package is advanced; and (j) presser means located downstream from the last mentioned plow means for holding the outer top wall section against the underlying section until the adhesive has set.

2. In a mechanism for folding a prescored blank of foldable paperboard about a group of two rows of bottles positioned on a bottom wall panel of the blank to form a tubular carton having open ends, the blank being of the type including side walls hinged on the side edges of the bottom wall panel, the bottom and side walls having extending from their opposite edges relatively narrow, integrally hinged, flange sections, the flange sections being defined from their attached walls by score lines and having gusset fold sections connecting their ends, such sections being formed by inwardly converging score lines crossing such flanges and meeting at the ends of the respective score lines separating the bottom and side walls, said blank also including approximately triangular shaped tab centrally located on the free edge of the narrow flange section at each end of the bottom wall, a partition member placed in separating position on said blank between the bottles, such partition member including a generally rectangular, central panel extending longitudinally of the bottle rows, and the end edges of such panel being each formed with a downwardly directed abutment sufficiently close to the open end of the carton to retain the free apex portion of the tab when the tab is folded inward to a position approximately parallel with the bottom wall, the combination of:

(a) conveyor means for propelling a flat blank of the type described, with a bottle group on the bottom panel, in a direction parallel with the tubular axis of the package to be formed;

(b) means for folding upward the flanges on the ends of the bottom and side walls;

(c) means for swinging the side walls upward through a small angle and means for approximately concurrently folding the side wall flange sections to an inwardly inclined position over their attached side walls;

(d) means for swinging the side walls to upraised position and holding such side walls upraised, thereby serving to confine each of the side wall flange sections between the side wall and the respective adjacent end bottles of the bottle rows;

(e) means for folding each of said tabs inwardly and downwardly to bear against the respective edges of the partition to a position where the apex of said tab will snap beneath said downwardly directed abutment and will be retained thereby.

3. The invention, as defined in claim 2, in which there is included (a) additional conveyor means to advance the partially completed package in alignment with its tubular axis beyond the means for securing the top wall sections together;

(b) means for turning the package during its advance approximately 90°, whereby the tubular axis of the package is disposed transversely of its direction of movement;

(c) said tab folding means each comprising tab-engaging fingers rotatable on a vertical axis and swingable on a horizontal axis; and (d) means, timed with the travel of the package past the tab folding means, for rotating each tab engaging finger on its vertical axis and for swinging said finger on its horizontal axis to cause said finger to engage a tab and fold it downwardly to locked position beneath the partition abutment as the package advances.

4. In mechanism for folding a prescored blank of foldable paperboard about a bottle group positioned on a central or bottom wall panel of the blank to form a tubular carton having open ends, the blank being of the type having hinged side wall panels extending from opposite sides of the bottom wall, a top wall panel hingedly connected to each side wall panel, the combination of:

(a) conveyor means for advancing the flat blank in a path parallel with the hinge connections between the side walls and bottom wall;

(b) side wall folding means for folding upwardly at least one side wall as the blank is advanced, said folding means comprising a rotary member mounted to rotate on an axis located below the blank path;

(c) means for rotating said rotary member in timed relation with the travel of the blank advanced by the conveyor means and in the same direction;

(d) a section on the rotary member extending radially outward and arranged to engage a side wall on an advancing flat blank at a location spaced a short distance outward of the side wall hinge line, the radially extending section comprising a leading face portion having a convexly curved contour serving to swing the side wall progressively upward as the rotary member rotates; and (e) a guide element, located downstream from the rotary member, and arranged to engage the outer surface of the upwardly swung side wall and serving to hold such side wall in upraised position as the blank advances;

(f) means for folding top wall panels into lapping relation.

5. The invention, as defined in claim 4, in which the leading, convexly curved face portion of the radially extending section on the rotary member is joined with a second portion having a contour approximately concentric with the axis of rotation of the rotary member, said second portion serving to hold the upwardly swung side wall in raised position as the blank advances.

6. Mechanism for folding and sealing a prescored blank of foldable paperboard about a group of two rows of tapered top bottles positioned on a central or bottom wall panel of the blank to form a tubular carton having open ends, the blank being of the type having extending successively from opposite sides of the bottom wall panel hingedly connected side wall panels, hingedly connected upper wall panels adapted to assume an inclined position (herein referred to by the term "inclined walls"), and hingedly connected top wall sections, the free edge portions of which are adapted to be secured in lapping relation to form a composite top wall, said mechanism comprising the combination of:

(a) conveyor means for advancing the blank and bottle assembly in a direction lengthwise of the bottle rows with the side walls, together with the wall panels carried thereby, folded to upraised positions along the respective bottle rows;

(b) an elongated support member disposed above the bottle tops and extending lengthwise of the conveyor travel;

(c) plow means for folding the underlying top wall section, during advance of the assembmly, to flatwise position upon said support and for folding to an inclined position the inclined wall which carries such top section;

(d) an adhesive applicator roll arranged above said elongated support member to apply adhesive to the underlying top wall section;

(e) plow means operatively located with respect to such assembly to fold the outer top wall section, and its connected inclined wall, inwardly as the assembly advances to bring the inclined wall to inclined position adjacent the tapered bottle tops;

(f) plow means for folding downwardly the overlying top wall section into lapping relation with the underlying top wall section;

(g) presser means for applying pressure to the lapped wall sections;

(h) means for folding the outer top wall section outwardly relative to its attached inclined wall to cause it to travel in a path in which it will be clear of the adhesive applicator roll.

7. In mechanism for forming a package comprising two rows of bottles enclosed in a tubular carton of foldable paperboard having open ends, said carton including: a bottom wall panel on which the bottle rows are placed, upstanding side walls at the sides of the bottle rows, a top wall, a narrow, upstanding flange on each end of the bottom wall panel, each such flange section extending across one of the carton open ends, and an inwardly foldable, approximately triangular tab integrally hinged along one side at a central position on the upper edge of each end flange, there being contained within the package a partition member having a generally rectangular, central, vertical panel extending longitudinally of the bottle rows, at least one of the end edges of such panel being formed with a downwardly directed abutment sufficiently close to the open end of the carton to retain the free apex portion of the triangular tab when the tab is folded inward to a position approximately parallel with the bottom wall panel, the combination of:

(a) conveyor means for advancing the package with the axis through its open ends extending transversely of the package path;

(b) a tab folding means located at the side of the package path to engage and tuck the apex portion of the adjacent triangular tab beneath the abutment on the partition panel as the package advances, said tab folding means including a tab engaging finger pivotally mounted on a support to swing through a sufficient arc to depress the tab from an upright position to an inclined position somewhat below the horizontal, said support being mounted to rotate on a vertical axis; and means timed with the travel of the package past the tab folding means for rotating the support for the tab engaging finger and for swinging the finger on its horizontal axis to cause the finger to engage an upright tab and swing it down beyond the horizontal and subsequently to swing the finger upwardly out of contact with the tab, whereby such tab will snap into position below the abutment and remain in locked position thereunder.

8. Mechanism for folding and sealing a prescored blank of foldable paperboard about a group of two rows of tapered top bottles positioned n a bottom wall panel of the blank to form a tubular carton having open ends, the blank being of the type having extending successively from opposite sides of the bottom wall panel hingedly connected side wall panels, hingedly connected upper wall panels adapted to assume an inclined position (herein referred to by the term "inclined walls"), and hingedly connected top wall sections, the free edge portions of which are adapted to be secured in lapping relation to form a composite top wall, the bottom and side walls having extending from their opposite edges relatively narrow, integrally hinged, flanged sections, the narrow flange sections on the bottom and side walls being defined from their attached walls by score lines and having gusset fold sections connecting their ends, such sections being formed by inwardly converging score lines crossing such narrow flanges and meeting at the ends of the respective score lines separating the bottom and side walls, said mechanism comprising the combination of:
 (a) conveyor means for propelling the blank in a direction aligned with the tubular axis of the package to be formed;
 (b) leading and trailing folding means operatively supported to travel with the conveyed blank to swing the narrow flanges thereon to upwardly raised positions and hold them for a limited time in such positions with the bottom wall flange sections disposed adjacent the end bottles of the rows;
 (c) folding means at each side of the blank conveyor for slightly folding upward the respective side walls about their hinge connections with the bottom wall as the assembly advances;
 (d) flange folding means for the side wall end flange sections, such means including members arranged to travel in synchronism with the conveyed blank and having leading and trailing flange-engaging elements, and means for moving such elements between inoperative and operative, flange-engaging positions as said elements advance, said flange-engaging elements being timed to move to operative positions to engage and swing the side wall flange sections inwardly approximately concurrently with the slight upward folding of the side walls, such inward swinging of the flange sections serving to bring them to an inclined position over their attached side walls;
 (e) additional side wall folding means located adjacent said conveyor means;
 (f) supporting means, comprising an elongated guidebar, extending longitudinally above the conveyor means.

9. Mechanism for folding and sealing a prescored blank of foldable paperboard about a group of two rows of tapered top bottles positioned on a central or bottom wall panel of the blank to form a tubular carton having open ends, the blank being of the type having extending successively from opposite sides of the bottom wall panel hingedly connected side wall panels, hingedly connected upper wall panels adapted to assume an inclined position (herein referred to by the term "inclined walls"), and hingedly connected top wall sections, the free edge portions of which are adapted to be secured in lapping relation to form a composite top wall, said mechanism comprising the combination of:
 (a) conveyor means for advancing the blank and bottle assembly in a direction lengthwise of the bottle rows with the side walls, together with the wall panels carried thereby, folded to upraised positions along the respective bottle rows;
 (b) an elongated support member disposed above the bottle tops and extending lengthwise of the conveyor travel;
 (c) plow means for folding the underlying top wall section, during advance of the assembly, to flatwise position upon said support and for folding to an inclined position the inclined wall which carries such top section;
 (d) an adhesive applicator roll arranged above said elongated support member to apply adhesive to the underlying top wall section;
 (e) plow means operatively located with respect to such assembly to fold the outer top wall section, and its connected inclined wall, inwardly as the assembly advances to bring the inclined wall to inclined position adjacent the tapered bottle tops;
 (f) plow means for folding downwardly the overlying top wall section into lapping relation with the underlying top wall section;
 (g) means for folding the outer top wall section outwardly relative to its adjacent inclined wall so as to prevent contact between said section and said adhesive applicator roll.

10. In mechanism for forming a package comprising two rows of bottles enclosed in a tubular carton of foldable paperboard having open ends, said carton including: a bottom wall panel on which the bottle rows are placed, upstanding side walls at the sides of the bottle rows, a top wall, a narrow, upstanding flange on each end of the bottom wall panel, each such flange section extending across one of the carton open ends, and an inwardly foldable, approximately triangular tab integrally hinged along one side at a central position on the upper edge of each end flange, there being contained within the package a partition member having a generally rectangular, central, vertical panel extending longitudinally of the bottle rows, at least one of the end edges of such panel being formed with a downwardly directed abutment sufficiently close to the open end of the carton to retain the free apex portion of the triangular tab when the tab is folded inward to a position approximately parallel with the bottom wall panel, the combination of:
 (a) conveyor means for advancing the package with the axis through its open ends extending transversely of the package path;
 (b) a tab engaging finger pivotally mounted on a rotary support to swing in a vertical plane through a sufficient arc to depress the tab from an upright position to an inclined position; and
 (c) means responsive to the travel of said conveyor for rotating said support to permit engagement of said tab by said finger.

References Cited

UNITED STATES PATENTS

| | | | |
|---|---|---|---|
| 1,266,686 | 5/1918 | Johnson | 53—230 X |
| 2,932,929 | 4/1960 | Fahrenbach et al. | 53—209 X |
| 3,058,271 | 10/1962 | McGihon | 53—48 X |
| 3,108,414 | 10/1963 | Schleicher et al. | 53—48 |
| 3,191,353 | 6/1965 | Chidsey | 53—48 |
| 3,300,947 | 1/1967 | Fahrenbach | 53—186 |

THERON E. CONDON, Primary Examiner

N. ABRAMS, Assistant Examiner

U.S. Cl. X.R.

53—209; 198—33